US012573691B2

(12) United States Patent
Kageyama

(10) Patent No.: US 12,573,691 B2
(45) Date of Patent: Mar. 10, 2026

(54) OUTER PACKAGING FOR ELECTRICAL STORAGE DEVICES, METHOD FOR MANUFACTURING SAID OUTER PACKAGING, AND ELECTRICAL STORAGE DEVICE

(71) Applicant: DAI NIPPON PRINTING CO., LTD., Tokyo (JP)

(72) Inventor: Jun Kageyama, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 702 days.

(21) Appl. No.: 17/915,774

(22) PCT Filed: Apr. 2, 2021

(86) PCT No.: PCT/JP2021/014413
§ 371 (c)(1),
(2) Date: Sep. 29, 2022

(87) PCT Pub. No.: WO2021/201294
PCT Pub. Date: Oct. 7, 2021

(65) Prior Publication Data
US 2023/0223620 A1 Jul. 13, 2023

(30) Foreign Application Priority Data
Apr. 3, 2020 (JP) ................................ 2020-067560

(51) Int. Cl.
*H01M 50/126* (2021.01)
*H01M 50/121* (2021.01)
*H01M 50/134* (2021.01)

(52) U.S. Cl.
CPC ....... *H01M 50/126* (2021.01); *H01M 50/121* (2021.01); *H01M 50/134* (2021.01)

(58) Field of Classification Search
CPC ............ H01M 50/126; H01M 50/121; H01M 50/105; H01M 50/134
See application file for complete search history.

(56) References Cited

U.S. PATENT DOCUMENTS

2008/0286635 A1 11/2008 Seino et al.

FOREIGN PATENT DOCUMENTS

| | | | |
|---|---|---|---|
| JP | 2008-287971 | A | 11/2008 |
| JP | 2016-72212 | A | 5/2016 |
| JP | 2016-171078 | A | 9/2016 |
| JP | 2019-29300 | A | 2/2019 |
| WO | 2017/188445 | A1 | 11/2017 |

OTHER PUBLICATIONS

Jun. 15, 2021 International Search Report issued in International Patent Application No. PCT/JP2021/014413.

*Primary Examiner* — Sarah A. Slifka
(74) *Attorney, Agent, or Firm* — OLIFF PLC

(57) ABSTRACT

An outer packaging for electrical storage devices is composed of a laminate provided with at least a substrate layer, a barrier layer, an adhesive layer, and a thermally adhesive resin layer in this order, wherein the peak melting temperature for the thermally adhesive resin layer is observed at 130° C. or lower, the peak melting temperature for the adhesive layer is observed at 135° C. or higher, the resin constituting the thermally adhesive resin layer has a polyolefin skeleton, and the resin constituting the adhesive layer has a polyolefin skeleton.

13 Claims, 4 Drawing Sheets

OUTER PACKAGING FOR ELECTRICAL STORAGE DEVICES, METHOD FOR MANUFACTURING SAID OUTER PACKAGING, AND ELECTRICAL STORAGE DEVICE

TECHNICAL FIELD

The present disclosure relates to an exterior material for an electrical storage device, a method of manufacturing the same, and an electrical storage device.

BACKGROUND ART

Conventionally, various types of electrical storage devices have been developed, but in any electrical storage device, an exterior material is an indispensable member for sealing an electrical storage device element such as an electrode or an electrolyte. Conventionally, metal exterior materials have been widely used as exterior materials for electrical storage devices.

On the other hand, in recent years, along with improvement in performance of electric vehicles, hybrid electric vehicles, personal computers, cameras, mobile phones, and the like, various shapes are required for electrical storage devices, and thickness reduction and weight reduction are required. However, metal exterior materials for electrical storage devices which have been widely used heretofore have a disadvantage that it is difficult to follow diversification of shapes and there is a limit to weight reduction.

Therefore, conventionally, a film-shaped laminate in which a base material layer, a barrier layer, an adhesive layer and a heat-sealable resin layer are laminated in this order has been proposed as an exterior material for an electrical storage device which can be easily processed into various shapes and can realize thickness reduction and weight reduction (See, for example, Patent Document 1).

In such an exterior material for an electrical storage device, generally, a concave portion is formed by cold molding, an electrical storage device element such as an electrode or an electrolytic solution is disposed in a space formed by the concave portion, and the heat-sealable resin layer is heat-sealed, whereby an electrical storage device in which the electrical storage device element is accommodated in the interior of the exterior material for an electrical storage device is obtained.

PRIOR ART DOCUMENT

Patent Document

Patent Document 1: Japanese Patent Laid-open Publication No. 2008-287971

SUMMARY OF THE INVENTION

Problems to be Solved by the Invention

Conventionally, a resin having a high melting point is used as a heat-sealable resin layer of a laminated film-shaped exterior material for an electrical storage device from the viewpoint of excellent heat resistance. Therefore, the heat-sealing of the heat-sealable resin layer is performed at a high temperature of about 200° C.

However, when heat-sealing is performed at such a high temperature, a heat-sealed part of the exterior material is crushed to reduce the thickness, and there is a concern that, for example, insulation quality is lowered.

Therefore, it is conceivable to set a heat seal temperature low to suppress the crushing of the heat-sealed part of the exterior material.

However, when heat-sealing is performed at a low temperature, there is a problem that heat-sealing strength between heat-sealable resin layers is reduced. For example, in a process of manufacturing an electrical storage device, it is common to seal an electrical storage device element with an exterior material for an electrical storage device and then age the electrical storage device in an environment of about 100° C. When the exterior material for an electrical storage device is heat-sealed at a low temperature, the exterior material for an electrical storage device is opened in an environment of about 100° C., and there is a possibility that sufficient sealability cannot be secured.

Under such circumstances, a main object of the present disclosure is to provide an exterior material for an electrical storage device including a laminate including at least a base material layer, a barrier layer, an adhesive layer, and a heat-sealable resin layer in this order, in which the heat-sealable resin layers are heat-sealed with each other at a temperature (for example, about 120° C.) lower than a conventional heat-sealing temperature (about 200° C.) to form an electrical storage device, and the exterior material for an electrical storage device is not unsealed even when the electrical storage device is exposed to an environment of about 100° C.

Means for Solving the Problem

The inventor of the present disclosure has conducted intensive studies to solve the above problems. As a result, for an exterior material for an electrical storage device including a laminate including at least a base material layer, a barrier layer, an adhesive layer, and a heat-sealable resin layer in this order, in which the heat-sealable resin layer has a melting peak temperature observed at 130° C. or lower, the adhesive layer has a melting peak temperature observed at 135° C. or higher, a resin constituting the heat-sealable resin layer has a polyolefin backbone, and a resin constituting the adhesive layer has a polyolefin backbone, it has been found that, even when heat-sealable resin layers are heat-sealed with each other at a temperature (for example, about 120° C.) lower than a conventional heat-sealing temperature (about 200° C.) to form an electrical storage device, and the electrical storage device is exposed to an environment of about 100° C., the exterior material for the electrical storage device is not opened.

The present disclosure has been completed by further conducting studies based on these findings. That is, the present disclosure provides inventions of the following aspects.

An exterior material for an electrical storage device, the exterior material including a laminate provided with at least a base material layer, a barrier layer, an adhesive layer, and a heat-sealable resin layer in this order, wherein

- the heat-sealable resin layer has a melting peak temperature observed at 130° C. or lower,
- the adhesive layer has a melting peak temperature observed at 135° C. or higher,
- a resin constituting the heat-sealable resin layer has a polyolefin backbone, and
- a resin constituting the adhesive layer has a polyolefin backbone.

Furthermore, also for an exterior material for an electrical storage device including a laminate provided with at least a base material layer, a barrier layer, an adhesive layer, and a heat-sealable resin layer in this order, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method, the inventor of the present disclosure has found that, even when heat-sealable resin layers are heat-sealed with each other at a temperature (for example, about 120° C.) lower than a conventional heat-sealing temperature (about 200° C.) to form an electrical storage device, and the electrical storage device is exposed to an environment of about 100° C., the exterior material for the electrical storage device is not opened.

The present disclosure also provides inventions of the following aspects.

An exterior material for an electrical storage device, the exterior material including a laminate provided with at least a base material layer, a barrier layer, an adhesive layer, and a heat-sealable resin layer in this order, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

Advantages of the Invention

According to the present disclosure, it is possible to provide an exterior material for an electrical storage device including a laminate provided with at least a base material layer, a barrier layer, an adhesive layer, and a heat-sealable resin layer in this order, in which heat-sealable resin layers are heat-sealed with each other at a temperature (for example, about 120° C.) lower than a conventional heat-sealing temperature (about 200° C.) to form an electrical storage device, and the exterior material for the electrical storage device is not opened even when the electrical storage device is exposed to an environment of about 100° C. Furthermore, according to the present disclosure, it is also possible to provide a method of manufacturing an exterior material for an electrical storage device, and an electrical storage device.

BRIEF DESCRIPTION OF THE DRAWINGS

FIG. 6 is a schematic diagram for explaining a method of measuring a heat-sealing strength.

EMBODIMENTS OF THE INVENTION

Figure 1:
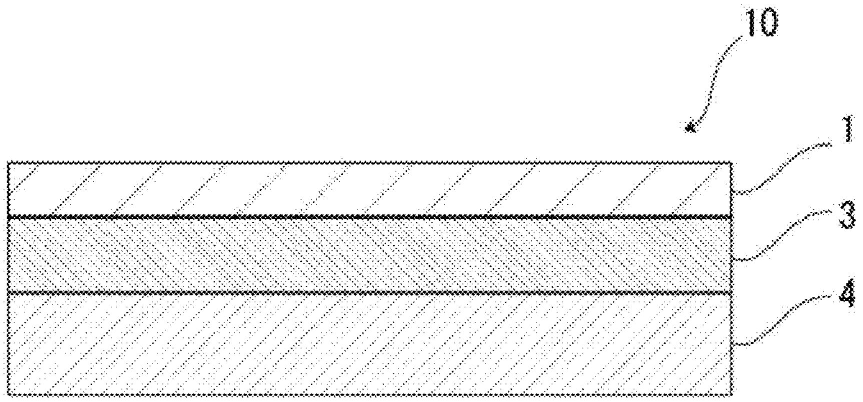
FIG. 1 is a schematic diagram illustrating an example of a cross-sectional structure of an exterior material for an electrical storage device of the present disclosure.

An exterior material for an electrical storage device according to a first embodiment of the present disclosure is an exterior material for an electrical storage device, the exterior material including a laminate provided with at least a base material layer, a barrier layer, an adhesive layer, and a heat-sealable resin layer in this order, in which the heat-sealable resin layer has a melting peak temperature observed at 130° C. or lower, the adhesive layer has a melting peak temperature observed at 135° C. or higher, a resin constituting the heat-sealable resin layer has a polyolefin backbone, and a resin constituting the adhesive layer has a polyolefin backbone. Since the exterior material for an electrical storage device according to the first embodiment of the present disclosure has the above configuration, heat-sealable resin layers are heat-sealed with each other at a temperature (for example, about 120° C.) lower than a conventional heat-sealing temperature (about 200° C.) to form an electrical storage device, and the exterior material for the electrical storage device is not opened even if the electrical storage device is exposed to an environment of about 100° C.

Furthermore, an exterior material for an electrical storage device according to a second embodiment of the present disclosure is an exterior material for an electrical storage device, the exterior material including a laminate provided with at least a base material layer, a barrier layer, an adhesive layer, and a heat-sealable resin layer in this order, in which a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method. Since the exterior material for an electrical storage device according to the second embodiment of the present disclosure has the above configuration, heat-sealable resin layers are heat-sealed with each other at a temperature (for example, about 120° C.) lower than a conventional heat-sealing temperature (about 200° C.) to form an electrical storage device, and the exterior material for the electrical storage device is not opened even when the electrical storage device is exposed to an environment of about 100° C.

Hereinafter, an exterior material for an electrical storage device of the present disclosure will be described in detail. Note that, in the present disclosure, a numerical range indicated by "to" means "greater than or equal to" and "less than or equal to". For example, the notation 2 to 15 mm means 2 mm or more and 15 mm or less.

Note that, in the exterior material for an electrical storage device, MD (Machine Direction) and TD (Transverse Direction) in the manufacturing process of a barrier layer 3 described later can be usually discriminated. For example, in a case where the barrier layer 3 is made of a metal foil such as an aluminum alloy foil or a stainless steel foil, a linear streak called a so-called rolling mark is formed on a surface of the metal foil in a rolling direction (RD) of the metal foil. Since the rolling marks extend along the rolling direction, the rolling direction of the metal foil can be grasped by observing the surface of the metal foil. Furthermore, in the manufacturing process of a laminate, the MD of the laminate and the RD of the metal foil usually coincide with each other, and thus the MD of the laminate can be specified by observing the surface of the metal foil of the laminate and specifying the rolling direction (RD) of the metal foil. Furthermore, since the TD of the laminate is perpendicular to the MD of the laminate, the TD of the laminate can also be specified.

Furthermore, in a case where the MD of the exterior material for an electrical storage device cannot be specified due to a rolling mark of a metal foil such as an aluminum alloy foil or a stainless steel foil, the MD can be specified by the following method. As a method of confirming the MD of the exterior material for an electrical storage device, there is a method of observing a cross section of a heat-sealable resin layer of the exterior material for an electrical storage device with an electron microscope to confirm a sea-island structure. In this method, a direction parallel to the cross section in which an average of the diameters of the island shapes in a direction perpendicular to a thickness direction of the heat-sealable resin layer is maximum can be determined as MD. Specifically, the cross section in a length direction of the heat-sealable resin layer and each cross section (10 cross sections in total) from a direction parallel to the cross section in the length direction to a direction perpendicular to the cross section in the length direction while changing an angle by 10 degrees from the direction parallel to the cross section in the length direction are observed with an electron microscope to confirm the sea-island structure. Next, in each cross section, the shape of each island is observed. For the shape of each island, a straight line distance connecting a leftmost end in a vertical direction with respect to a thickness direction of the heat-sealable resin layer and a rightmost end in the vertical direction is defined as a diameter y. In each cross section, an average of the top 20 diameters y is calculated in descending order of the diameter y of the island shape. A direction parallel to the cross section having the largest average of the diameters y of the island shape is determined as MD.

Furthermore, in the following description, the exterior material for an electrical storage device according to the first embodiment will be mainly described. The matters common to the first embodiment and the second embodiment will be described as the description of the present disclosure, and the description of each embodiment will be clearly described.

1. Laminated Structure and Physical Property of Exterior Material for Electrical Storage Device As illustrated in FIG. 1, for example, an exterior material 10 for an electrical storage device of the present disclosure is formed of a laminate including a base material layer 1, a barrier layer 3, an adhesive layer 5, and a heat-sealable resin layer 4 in this order. In the exterior material 10 for an electrical storage device, the base material layer 1 is an outermost layer side, and the heat-sealable resin layer 4 is an innermost layer. When an electrical storage device is assembled using the exterior material 10 for an electrical storage device and an electrical storage device element, the electrical storage device element is housed in a space formed by thermally fusing a peripheral part in a state where the heat-sealable resin layers 4 of the exterior material 10 for an electrical storage device face each other. In the laminate constituting the exterior material 10 for an electrical storage device of the present disclosure, a side of the heat-sealable resin layer 4 with respect to the barrier layer 3 is an inner side, and a side of the base material layer 1 with respect to the barrier layer 3 is an outer side with respect to the barrier layer 3.

Figure 2:
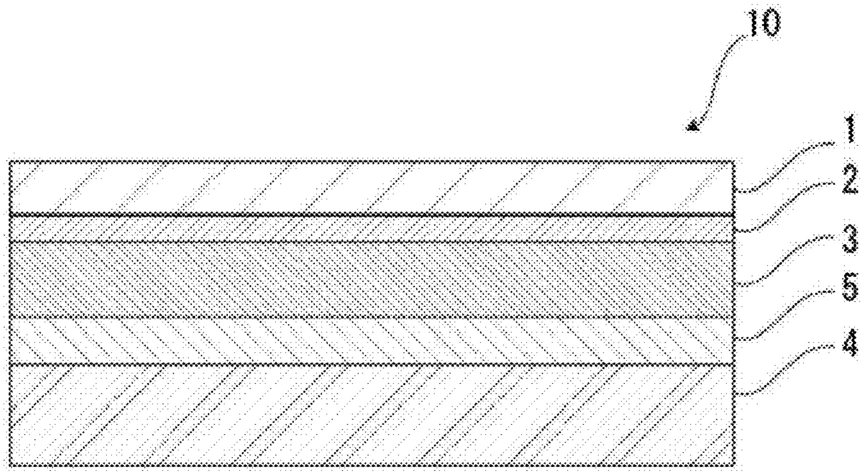
FIG. 2 is a schematic diagram illustrating an example of a cross-sectional structure of the exterior material for an electrical storage device of the present disclosure.
Figure 3:
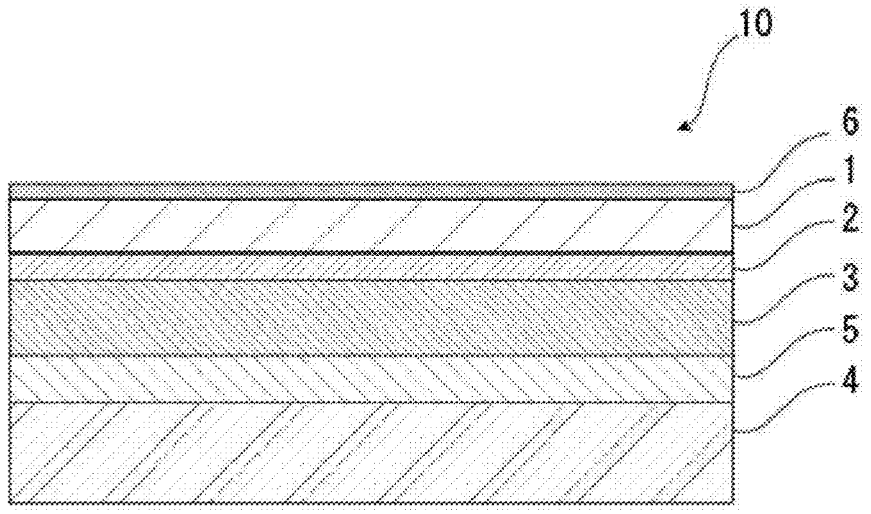
FIG. 3 is a schematic diagram illustrating an example of a cross-sectional structure of the exterior material for an electrical storage device of the present disclosure.
Figure 4A:
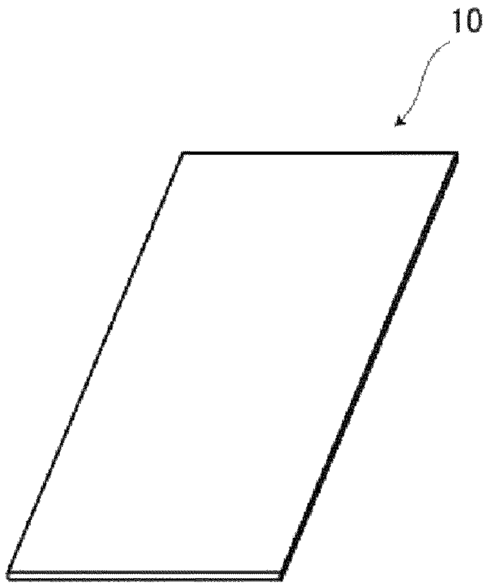
FIG. 4 is a schematic diagram for explaining a method of housing an electrical storage device element in a packaging formed of the exterior material for an electrical storage device of the present disclosure.
Figure 4B:
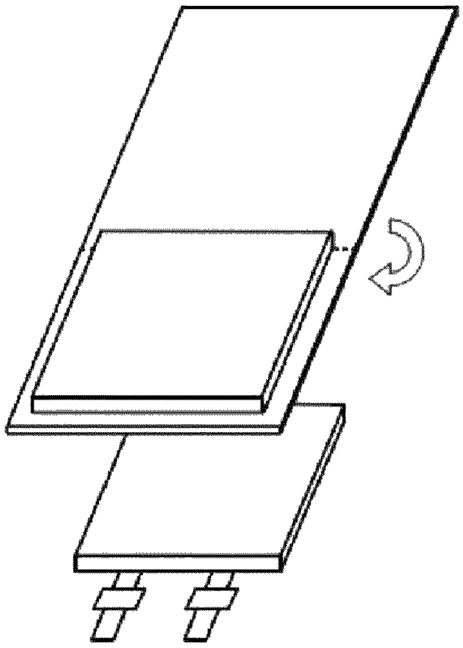
Figure 4C:
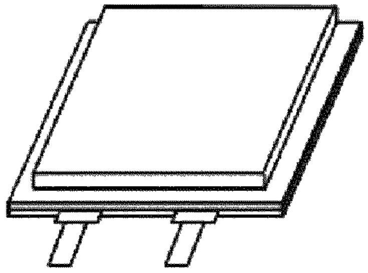
Figure 4D:
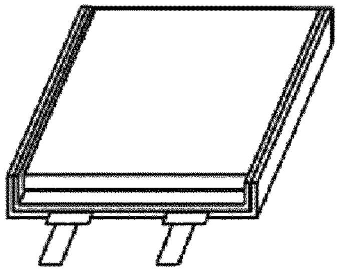

For example, as illustrated in FIG. 2 and FIG. 3, the exterior material 10 for an electrical storage device may have an adhesive agent layer 2 between the base material layer 1 and the barrier layer 3 as necessary for the purpose of, for example, improving bondability between these layers. Furthermore, as illustrated in FIG. 3, a surface coating layer 6 or the like may be provided on an outer side of the base material layer 1 (a side opposite to the side of the heat-sealable resin layer 4) as necessary.

A thickness of the laminate constituting the exterior material 10 for an electrical storage device is not particularly limited, but it is preferably about 180 μm or less, about 155 μm or less, or about 120 μm or less from the viewpoint of cost reduction, energy density improvement, and the like. Furthermore, the thickness of the laminate constituting the exterior material 10 for an electrical storage device is preferably about 35 μm or more, about 45 μm or more, or about 60 μm or more for maintaining a function of the exterior material for an electrical storage device of protecting an electrical storage device element. Further, preferable ranges of the laminate constituting the exterior material 10 for an electrical storage device include, for example, about 35 to 180 μm, about 35 to 155 μm, about 35 to 120 μm, about 45 to 180 μm, about 45 to 155 μm, about 45 to 120 μm, about 60 to 180 μm, about 60 to 155 μm, and about 60 to 120 μm, and particularly preferably about 60 to 155 μm.

In the exterior material 10 for an electrical storage device, a ratio of a total thickness of the base material layer 1, the adhesive agent layer 2 provided as necessary, the barrier layer 3, the adhesive layer 5, the heat-sealable resin layer 4, and the surface coating layer 6 provided as necessary to a thickness (total thickness) of the laminate constituting the exterior material 10 for an electrical storage device is preferably 90% or more, more preferably 95% or more, and still more preferably 98% or more. As a specific example, in a case where the exterior material 10 for an electrical storage device of the present disclosure includes the base material layer 1, the adhesive agent layer 2, the barrier layer 3, the adhesive layer 5, and the heat-sealable resin layer 4, the ratio of the total thickness of these layers to the thickness (total thickness) of the laminate constituting the exterior material 10 for an electrical storage device is preferably 90% or more, more preferably 95% or more, and still more preferably 98% or more.

From the viewpoint of more suitably exhibiting the effect of the invention of the present disclosure, the exterior material 10 for an electrical storage device of the present disclosure preferably has a heat-sealing strength of about 35 N/15 mm or more, more preferably about 40 N/15 mm or more, still more preferably about 45 N/15 mm or more, and still more preferably about 50 N/15 mm or more in heat-sealing strength measurement measured by heat-sealing the heat-sealable resin layers 4 to each other under conditions of a temperature of 120° C., a surface pressure of 1.0 MPa and 3 seconds, and delaminate the heat-sealable resin layers 4 from each other. Furthermore, from the same viewpoint, the heat-sealing strength is preferably about 80 N/15 mm or less, more preferably about 70 N/15 mm or less, and still more preferably about 60 N/15 mm or less. Preferable ranges of the heat-sealing strength include about 35 to 80 N/15 mm, about 35 to 70 N/15 mm, about 35 to 60 N/15 mm, about 40 to 80 N/15 mm, about 40 to 70 N/15 mm, about 40 to 60 N/15 mm, about 45 to 80 N/15 mm, about 45 to 70 N/15 mm, about 45 to 60 N/15 mm, about 50 to 80 N/15 mm, about 50 to 70 N/15 mm, and about 50 to 60 N/15 mm.

Furthermore, from the viewpoint of more suitably exhibiting the effect of the invention of the present disclosure, the exterior material 10 for an electrical storage device of the present disclosure has a heat-sealing strength of preferably about 80 N/15 mm or more, more preferably about 90 N/15 mm or more, and still more preferably about 95 N/15 mm or more in heat-sealing strength measurement measured by heat-sealing the heat-sealable resin layers 4 to each other under conditions of a temperature of 190° C., a surface pressure of 1.0 MPa and 3 seconds, and peeling the heat-sealable resin layers 4 from each other. Furthermore, from the same viewpoint, the heat-sealing strength is preferably about 130 N/15 mm or less, more preferably about 120 N/15 mm or less, and still more preferably about 110 N/15 mm or less. Preferable ranges of the heat-sealing strength include about 80 to 130 N/15 mm, about 80 to 120 N/15 mm, about 80 to 110 N/15 mm, about 90 to 130 N/15 mm, about 90 to 120 N/15 mm, about 90 to 110 N/15 mm, about 95 to 130 N/15 mm, about 95 to 120 N/15 mm, and about 95 to 110 N/15 mm.

The method of measuring the heat-sealing strength at 120° C. or 190° C. is as follows.

(Measurement of Heat-Sealing Strength)

Figures 5A, 5B, 5C, 5D, 5E:
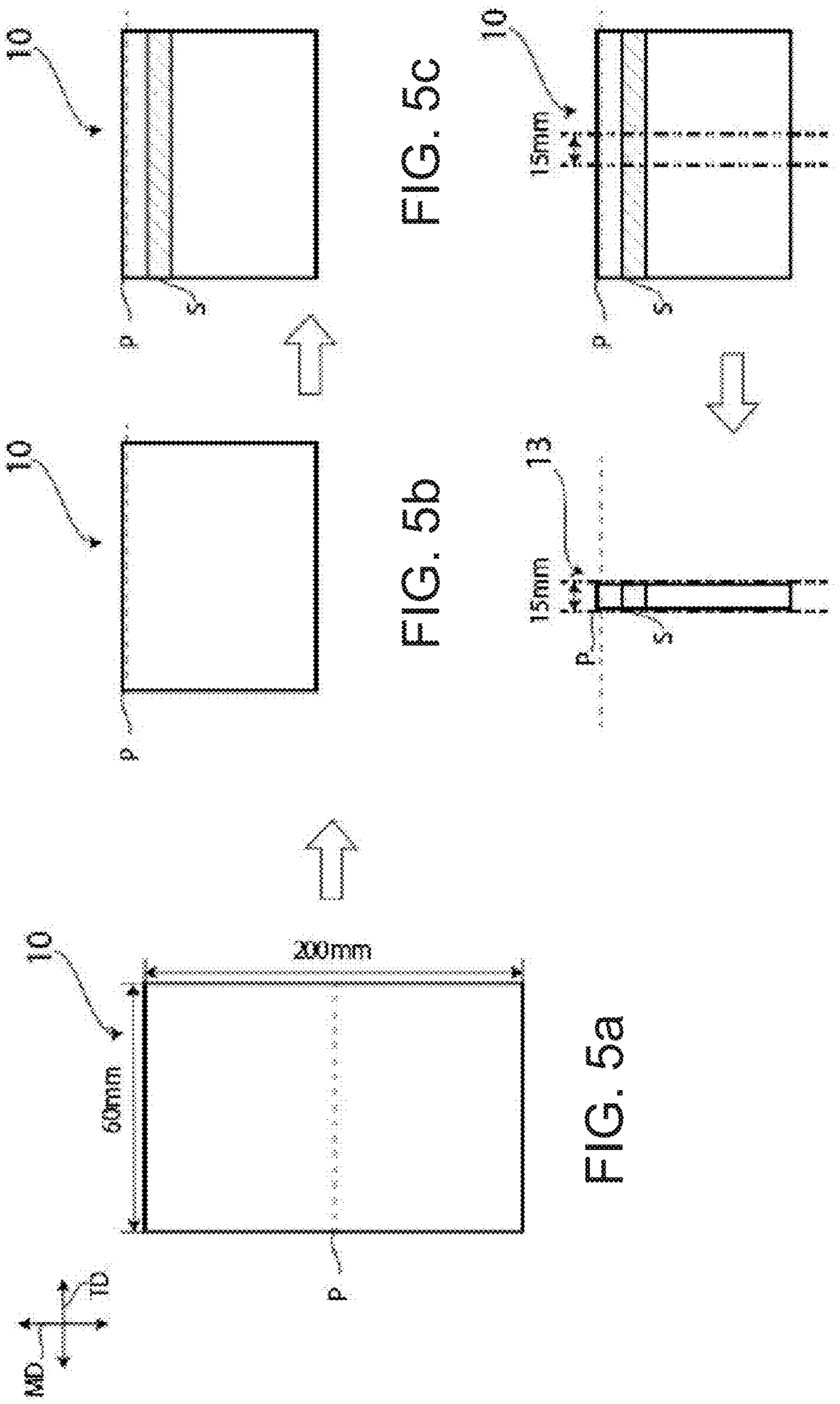
FIG. 5 is a schematic diagram for explaining a method of measuring a heat-sealing strength.

In accordance with the provision of JIS K7127:1999, the sealing strength of each exterior material for an electrical storage device is measured as follows. As a test piece, an exterior material for an electrical storage device which is cut into a strip shape having a width of 15 mm in the transverse direction is prepared. Specifically, as illustrated in FIG. 5, first, each exterior material for an electrical storage device is cut into a size of 60 mm (transverse direction)×200 mm (machine direction) (FIG. 5*a*). Next, the exterior material for an electrical storage device is folded in half in the machine direction at the position of a fold P (intermediate in the machine direction) such that the heat-sealable resin layers face each other (FIG. 5*b*). The heat-sealable resin layers are heat-sealed inside in the machine direction of about 10 mm from the fold P under conditions of a seal width of 7 mm, a temperature of 120° C. or 190° C., a surface pressure of 1.0 MPa, and 3 seconds (FIG. 5*c*). In FIG. 5*c*, a shaded part S is a heat-sealed part. Next, the test piece is obtained by cutting in the machine direction (cutting at the position of the two-dot chain line in FIG. 5*d*) so that the width in the transverse direction is 15 mm (FIG. 5*e*). Next, a test piece 13 is allowed to stand in an environment of 25° C. for 2 minutes, and the heat-sealable resin layer at the heat-sealed part is delaminated at a rate of 300 mm/min with a tensile tester (AG-Xplus (trade name) manufactured by SHIMADZU CORPORATION) in an environment of 25° C. (FIG. 6). The maximum strength at the time of delamination is defined as a heat-sealing strength (N/15 mm). A distance between chucks is 50 mm. It is an average value measured three times.

Furthermore, in the first embodiment, from the viewpoint of more suitably exerting the effect of the invention of the present disclosure, a Martens hardness, which is measured by pushing a Vickers indenter to a depth of 1 μm in a thickness direction from a surface on a side of the heat-sealable resin layer 4 of the exterior material 10 for an electrical storage device of the present disclosure at a measurement temperature (sample temperature) of 25° C. based on an indentation method, is preferably 25.0 MPa or more, more preferably 30.0 MPa or more, and still more preferably 40.0 MPa or more. From the same viewpoint, the Martens hardness is preferably 80.0 MPa or less, and more preferably 70.0 MPa. Preferable ranges of the Martens hardness include about 25.0 to 80.0 MPa, about 25.0 to 70.0 MPa, about 30.0 to 80.0 MPa, about 30.0 to 70.0 MPa, about 40.0 to 80.0 MPa, and about 40.0 to 70.0 MPa. Furthermore, in the second embodiment, from the viewpoint of more suitably exerting the effect of the invention of the present disclosure, the Martens hardness, which is measured by pushing a Vickers indenter to a depth of 1 μm in the thickness direction from the surface on the side of the heat-sealable resin layer 4 of the exterior material 10 for an electrical storage device of the present disclosure at a measurement temperature (sample temperature) of 25° C. based on an indentation method, is preferably 35.0 MPa or more, and more preferably 40.0 MPa or more. From the same viewpoint, the Martens hardness is preferably 80.0 MPa or less, and more preferably 70.0 MPa. Preferable ranges of the Martens hardness include about 30.0 to 80.0 MPa, about 30.0 to 70.0 MPa, about 35.0 to 80.0 MPa, about 35.0 to 70.0 MPa, about 40.0 to 80.0 MPa, and about 40.0 to 70.0 MPa. As a further effect that the Martens hardness at 25° C. falls within the above-mentioned range, there is an effect that, when the exterior material 10 for an electrical storage device is conveyed by a conveying roll made of metal or the like in a process of manufacturing an electrical storage device, the smoothness is suppressed from being impaired by the heat-sealable resin layer coming into contact with the conveying roll. Therefore, it is possible to perform heat-sealing in a state in which smoothness is not impaired at the time of heat-sealing, and high sealability can be exhibited even when the heat-sealable resin layers are heat-sealed to each other at a low temperature (for example, about 120° C.). Note that the term "the smoothness is impaired" means that the exterior material for an electrical storage device is rubbed against the conveying roll, and a scratch is generated in the heat-sealable resin layer. A method of measuring the Martens hardness is as follows.

(Measurement of Martens hardness)

On the basis of an indentation method, at a measurement temperature (sample temperature) of 25° C., a Vickers indenter is pushed to a depth of 1 μm in a thickness direction from a surface on the side of the heat-sealable resin layer of the exterior material for an electrical storage device, and Martens hardness is measured. The measurement conditions are as follows. The Martens hardness is calculated from a load-displacement curve obtained by the pushing of the Vickers indenter. As a measurement value, an average obtained for 10 portions of the surface on the side of the heat-sealable resin layer is adopted. The Martens hardness is determined by calculating the surface area A ($mm^2$) of the Vickers indenter at the maximum depth of indentation, and dividing the maximum load F(N) by the surface area A ($mm^2$) (F/A). As a measuring device, for example, PICODENTER HM-500 manufactured by Fischer Instruments is used. For example, the exterior material for an electrical storage device is bonded to one surface of a slide glass (76 mm×26 mm×1 mm) to which a double-sided adhesive tape is attached such that the side of the heat-sealable resin layer is opposite to the slide glass to obtain a measurement sample. Next, the surface hardness of the surface of the measurement sample on the side of the heat-sealable resin layer is measured.

<Measurement Conditions>

Indenter: Vickers (facing angle 136° of a tip part of quadrangular pyramid)

Measurement temperature (sample temperature): 25° C.

Speed: 1.000 μm/10 sec

Measurement depth: 1.0 μm

Retention time: 5 sec

Speed of return from pushing: 1.000 μm/10 sec

Furthermore, preferably, the exterior material for an electrical storage device of the present disclosure is not unsealed when subjected to the following unsealing test.

(Unsealing Test)

The exterior material for an electrical storage device was cut into a size of 100 mm×200 mm, and folded back at a center position of the long side of the exterior material for an electrical storage device so that the heat-sealable resin layers faced each other. Next, the short side is heat-sealed under conditions of a temperature of 120° C., a surface pressure of 1.0 MPa, 3 seconds, and a seal width of 7 mm. Moreover, one long side is heat-sealed in the same manner, 2.0 g of water is put in a bag-shaped sample, and then an opening side (long side) is heat-sealed in the same manner to obtain a test sample in which water is sealed. The test sample is placed in an oven and allowed to stand in an environment of 105° C. for 8 hours to check whether the test sample is unsealed.

2. Layers Forming Exterior Material for Electrical Storage Device

[Base Material Layer 1]

In the present disclosure, the base material layer 1 is a layer provided for the purpose of, for example, exhibiting a function as a base material of an exterior material for an electrical storage device. The base material layer 1 is positioned on an outer layer side of the exterior material for an electrical storage device.

The material for forming the base material layer 1 is not particularly limited as long as it has a function as a base material, that is, at least insulation quality. The base material layer 1 can be formed using, for example, a resin, and the resin may contain an additive described later.

In a case where the base material layer 1 is formed of a resin, the base material layer 1 may be, for example, a resin film formed of a resin, or may be formed by applying a resin. The resin film may be an unstretched film or a stretched film. Examples of the stretched film include a uniaxially stretched film and a biaxially stretched film, and a biaxially stretched film is preferable. Examples of the stretching method of forming the biaxially stretched film include a sequential biaxial stretching method, an inflation method, and a simultaneous biaxial stretching method. Examples of the method of applying the resin include a roll coating method, a gravure coating method, and an extrusion coating method.

Examples of the resin that forms the base material layer 1 include resins such as polyester, polyamide, polyolefin, epoxy resin, acrylic resin, fluororesin, polyurethane, silicone resin, and phenol resin, and modified products of these resins. Furthermore, the resin forming the base material layer 1 may be a copolymer of these resins or a modified product of the copolymer. Moreover, a mixture of these resins may be used.

Among these resins, preferred examples of the resin that forms the base material layer 1 include polyester and polyamide.

Specific examples of the polyester include polyethylene terephthalate, polybutylene terephthalate, polyethylene naphthalate, polybutylene naphthalate, polyethylene isophthalate, and copolymerized polyester. Furthermore, examples of the copolymerized polyester include copolymerized polyesters having ethylene terephthalate as a main repeating unit. Specific examples thereof include copolymer polyesters that are polymerized with ethylene isophthalate using ethylene terephthalate as a main repeating unit (Hereinafter, abbreviated according to polyethylene (terephthalate/isophthalate)), polyethylene (terephthalate/adipate), polyethylene (terephthalate/sodium sulfoisophthalate), polyethylene (terephthalate/sodium isophthalate), polyethylene (terephthalate/phenyl-dicarboxylate), and polyethylene (terephthalate/decane dicarboxylate). These polyesters may be used alone, or may be used in combination of two or more thereof.

Furthermore, specific examples of the polyamide include aliphatic polyamides such as nylon 6, nylon 66, nylon 610, nylon 12, nylon 46, and a copolymer of nylon 6 and nylon 66. Hexamethylenediamine-isophthalic acid-terephthalic acid copolymerized polyamides such as nylon 61, nylon 6T, nylon 61T, and nylon 616T (I represents isophthalic acid and T represents terephthalic acid) containing a structural unit derived from terephthalic acid and/or isophthalic acid, and aromatic-containing polyamides such as polyamide MXD6 (polymethaxylylene adipamide); alicyclic polyamide such as polyamide PACM6 (polybis (4-aminocyclohexyl) methane adipamide); Further, a polyamide obtained by copolymerizing a lactam component or an isocyanate component such as 4,4'-diphenylmethane-diisocyanate, or a polyester amide copolymer or a polyether ester amide copolymer which is a copolymer of a copolymerized polyamide and a polyester or a polyalkylene ether glycol. Examples thereof include polyamides such as copolymers thereof. These polyamides may be used alone, or may be used in combination of two or more thereof.

The base material layer 1 preferably contains at least one of a polyester film, a polyamide film, and a polyolefin film, preferably contains at least one of a stretched polyester film, a stretched polyamide film, and a stretched polyolefin film, further preferably contains at least one of a stretched polyethylene terephthalate film, a stretched polybutylene terephthalate film, a stretched nylon film, and a stretched polypropylene film, and further preferably contains at least one of a biaxially stretched polyethylene terephthalate film, a biaxially stretched polybutylene terephthalate film, a biaxially stretched nylon film, and a biaxially stretched polypropylene film.

The base material layer 1 may be a single layer or may be composed of two or more layers. In a case where the base material layer 1 is composed of two or more layers, the base material layer 1 may be a laminate obtained by laminating a resin film with an adhesive or the like, or may be a laminate of a resin film obtained by co-extruding a resin into two or more layers. Furthermore, a laminate of two or more resin films formed by co-extruding a resin may be used as the base material layer 1 in an unstretched state, or may be used as the base material layer 1 by uniaxial stretching or biaxial stretching.

Specific examples of the laminate of two or more layers of resin films in the base material layer 1 include a laminate of a polyester film and a nylon film, a laminate of two or more layers of nylon films, and a laminate of two or more layers of polyester films. Preferably, a laminate of a stretched nylon film and a stretched polyester film, a laminate of two or more layers of stretched nylon films, and a laminate of two or more layers of stretched polyester films are preferred. For example, in a case where the base material layer 1 is a laminate of two layers of resin films, a laminate of a polyester resin film and a polyester resin film, a laminate of a polyamide resin film and a polyamide resin film, or a laminate of a polyester resin film and a polyamide resin film is preferable, and a laminate of a polyethylene terephthalate film and a polyethylene terephthalate film, a laminate of a nylon film and a nylon film, or a laminate of a polyethylene terephthalate film and a nylon film is more preferable. Furthermore, when the base material layer 1 is a laminate of two or more resin films, it is preferable that the polyester resin film is located at the outermost layer of the base material layer 1, because the polyester resin is hardly discolored, for example, when the electrolytic solution adheres to the surface.

In a case where the base material layer 1 is a laminate of two or more resin films, the two or more resin films may be laminated with an adhesive interposed therebetween. Preferable examples of the adhesive include the same as the adhesive exemplified in the adhesive agent layer 2 described later. Note that the method of laminating two or more resin films is not particularly limited, and a known method can be employed, and examples thereof include a dry lamination method, a sandwich lamination method, an extrusion lamination method, a thermal lamination method, and the like, and a dry lamination method is preferable. In a case where lamination is performed by the dry lamination method, a polyurethane adhesive is preferably used as the adhesive. At this time, a thickness of the adhesive is, for example, about 2 to 5 μm. Furthermore, an anchor coat layer may be formed and laminated on a resin film. Examples of the anchor coat layer include those similar to the adhesive exemplified in the adhesive agent layer 2 described later. At this time, the thickness of the anchor coat layer is, for example, about 0.01 to 1.0 μm.

Furthermore, additives such as a slipping agent, a flame retardant, an antiblocking agent, an antioxidant, a light stabilizer, a tackifier, and an antistatic agent may be present on at least one of the surface and the inside of the base material layer 1. The additive may be used singly or in combination of two or more kinds thereof.

In the present disclosure, it is preferable that a slipping agent exists on the surface of the base material layer 1 from the viewpoint of enhancing the moldability of the exterior material for an electrical storage device. The slipping agent is not particularly limited, but an amide-based slipping agent is preferable. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of the unsaturated fatty acid amide include oleic acid amide and erucic acid amide. Specific examples of the substituted amide include N-oleyl palmitic acid amide, N-stearyl stearic acid amide, N-stearyl oleic acid amide, N-oleyl stearic acid amide, and N-stearyl erucic acid amide. Furthermore, specific examples of the methylol amide include methylol stearic acid amide. Specific examples of the saturated fatty acid bis-amide include methylene bis-stearic acid amide, ethylene bis-capric acid amide, ethylene bis-lauric acid amide, ethylene bis-stearic acid amide, ethylene bis-hydroxystearic acid amide, ethylene bis-behenic acid amide, hexamethylene bis-stearic acid amide, hexamethylene bis-behenic acid amide, hexamethylene hydroxystearic acid amide, N,N'-distearyl adipic acid amide, and N,N'-distearyl sebacic acid amide. Specific examples of the unsaturated fatty acid bisamide include ethylene bis-oleic acid amide, ethylene bis-erucic acid amide, hexamethylene bis-oleic acid amide, N,N'-dioleyl adipic acid amide, and N,N'-dioleyl sebacic acid amide. Specific examples of the fatty acid ester amide include stearamide ethyl stearate. Furthermore, specific examples of the aromatic bisamide include m-xylylene bisstearic acid amide, m-xylylene bishydroxystearic acid amide, and N,N'-distearyl isophthalic acid amide. The slipping agent may be used alone, or may be used in combination of two or more thereof.

In a case where the slipping agent is present on the surface of the base material layer 1, an amount of the slipping agent present is not particularly limited, but is preferably about 3 $mg/m^2$ or more, more preferably about 4 to 15 $mg/m^2$, still more preferably about 5 to 14 $mg/m^2$.

The slipping agent present on the surface of the base material layer 1 may be obtained by exuding the slipping agent contained in the resin constituting the base material layer 1, or may be obtained by applying the slipping agent to the surface of the base material layer 1.

A thickness of the base material layer 1 is not particularly limited as long as a function as a base material is exhibited, and it is, for example, about 3 to 50 μm, preferably about 10 to 35 μm. In a case where the base material layer 1 is a laminate of two or more resin films, the thickness of each resin film constituting each layer is preferably about 2 to 25 μm.

[Adhesive Agent Layer 2]

In the exterior material for an electrical storage device of the present disclosure, the adhesive agent layer 2 is a layer provided between the base material layer 1 and the barrier layer 3 as necessary for the purpose of improving bondability between the base material layer 1 and the barrier layer 3.

The adhesive agent layer 2 is formed of an adhesive agent capable of bonding the base material layer 1 and the barrier layer 3. The adhesive agent used for forming the adhesive agent layer 2 is not limited, and may be any of a chemical reaction type, a solvent volatilization type, a heat melting type, a heat pressing type, and the like. Furthermore, the adhesive agent may be a two-liquid curable adhesive agent (two-liquid adhesive agent), a one-liquid curable adhesive agent (one-liquid adhesive agent), or a resin that does not undergo a curing reaction. Furthermore, the adhesive agent layer 2 may be a single layer or a multilayer.

Specific examples of the adhesive component contained in the adhesive agent include polyesters such as polyethylene terephthalate, polybutylene terephthalate, polyethylene naphthalate, polybutylene naphthalate, polyethylene isophthalate and copolymerized polyester; polyether; polyurethane; epoxy resin; phenol resin; polyamides such as nylon 6, nylon 66, nylon 12, and copolymerized polyamide; polyolefin-based resin such as polyolefin, cyclic polyolefin, acid-modified polyolefin, or acid-modified cyclic polyolefin; polyvinyl acetate; cellulose; (meth) acrylic resin; polyimide; polycarbonate; amino resins such as urea resin and melamine resin; rubber such as chloroprene rubber, nitrile rubber, and styrene-butadiene rubber; silicone resins and the like. These adhesive components may be used alone, or may be used in combination of two or more thereof. Among these adhesive components, a polyurethane adhesive agent is preferable. Furthermore, these resins as adhesive components can increase the adhesive strength by using an appropriate curing agent in combination. The curing agent is appropriately selected from a polyisocyanate, a polyfunctional epoxy resin, an oxazoline group-containing polymer, a polyamine resin, an acid anhydride, and the like according to the functional group of the adhesive component.

Examples of the polyurethane adhesive agent include a polyurethane adhesive agent containing a first agent containing a polyol compound and a second agent containing an isocyanate compound. Preferable examples thereof include a two-component curable polyurethane adhesive agent in which a polyol such as a polyester polyol, a polyether polyol, or an acrylic polyol is used as a first agent and an aromatic or aliphatic polyisocyanate is used as a second agent. Furthermore, examples of the polyurethane adhesive agent include a polyurethane adhesive agent containing a polyurethane compound obtained by reacting a polyol compound with an isocyanate compound in advance and an isocyanate compound. Furthermore, examples of the polyurethane adhesive agent include a polyurethane adhesive agent containing a polyurethane compound obtained by reacting a polyol compound with an isocyanate compound in advance and a polyol compound. Furthermore, examples of the polyurethane adhesive agent include a polyurethane adhesive agent obtained by curing a polyurethane compound obtained by reacting a polyol compound with an isocyanate compound in advance by reacting the polyurethane compound with moisture in the air or the like. As the polyol compound, it is preferable to use a polyester polyol having a hydroxyl group in the side chain in addition to the hydroxyl group at the terminal of the repeating unit. Examples of the second agent include aliphatic, alicyclic, aromatic, and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H12MDI), tolylene diisocyanate (TDI), diphenylmethane diisocyanate (MDI), and naphthalene diisocyanate (NDI). Furthermore, a polyfunctional isocyanate-modified product of one or two or more of these diisocyanates can be mentioned. Furthermore, as the polyisocyanate compound, a multimer (for example, a trimer) can also be used. Examples of such a multimer include adducts, biurets, and nurates. Since the adhesive agent layer 2 is formed of a polyurethane adhesive agent, excellent electrolytic solution resistance is imparted to the exterior material for an electrical storage device, and peeling of the base material layer 1 is suppressed even if the electrolytic solution adheres to the side surface.

Furthermore, the adhesive agent layer 2 allows addition of other components as long as bondability is not inhibited, and may contain a colorant, a thermoplastic elastomer, a tackifier, a filler, and the like. Since the adhesive agent layer 2 contains a colorant, the exterior material for an electric storage device can be colored. As the colorant, known colorants such as pigments and dyes can be used. Furthermore, the colorant may be used singly or in combination of two or more kinds thereof.

The type of pigment is not particularly limited as long as the bondability of the adhesive agent layer 2 is not impaired. Examples of the organic pigment include azo-based, phthalocyanine-based, quinacridone-based, anthraquinone-based, dioxazine-based, indigothioindigo-based, perinone-perylene-based, isoindolenine-based, and benzimidazolone-based pigments. Examples of the inorganic pigment include carbon-black-based, titanium-based, cadmium-based, lead-based, chromium-based, and iron-based pigments. In addition, examples of the inorganic pigment include fine powder of mica (mica) and fish scale foil.

Among the colorants, for example, carbon black is preferable in order to make the appearance of the exterior material for an electrical storage device black.

An average particle diameter of the pigment is not particularly limited, and is, for example, about 0.05 to 5 μm, preferably about 0.08 to 2 μm. Note that the average particle diameter of the pigment is a median diameter measured by a laser diffraction/scattering particle diameter distribution measuring device.

The content of the pigment in the adhesive agent layer 2 is not particularly limited as long as the exterior material for an electrical storage device is colored, and is, for example, about 5 to 60 mass %, preferably 10 to 40 mass %.

A thickness of the adhesive agent layer 2 is not particularly limited as long as the base material layer 1 and the barrier layer 3 can be adhered to each other, and is, for example, about 1 μm or more and about 2 μm or more. Furthermore, the thickness of the adhesive agent layer 2 is, for example, about 10 μm or less and about 5 μm or less. Furthermore, preferable ranges of the thickness of the adhesive agent layer 2 include about 1 to 10 μm, about 1 to 5 μm, about 2 to 10 μm, and about 2 to 5 μm.

[Colored Layer]

A colored layer is a layer provided between the base material layer 1 and the barrier layer 3 as necessary (illustration is omitted). In a case where the adhesive agent layer 2 is provided, a colored layer may be provided between the base material layer 1 and the adhesive agent layer 2 and between the adhesive agent layer 2 and the barrier layer 3. Furthermore, a colored layer may be provided outside the base material layer 1. By providing the colored layer, the exterior material for an electrical storage device can be colored.

The colored layer can be formed, for example, by applying an ink containing a colorant to the surface of the base material layer 1 or the surface of the barrier layer 3. As the colorant, known colorants such as pigments and dyes can be used. Furthermore, the colorant may be used singly or in combination of two or more kinds thereof.

Specific examples of the colorant contained in the colored layer include the same colorants as those exemplified in the section of [Adhesive agent layer 2].

[Barrier Layer 3]

In the exterior material for an electrical storage device, the barrier layer 3 is a layer that suppresses at least infiltration of moisture.

Examples of the barrier layer 3 include a metal foil having a barrier property, a deposited film, and a resin layer. Examples of the deposited film include a metal deposited film, an inorganic oxide deposited film, and a carbon-containing inorganic oxide deposited film, and examples of the resin layer include fluorine-containing resins such as polymers mainly composed of polyvinylidene chloride, chlorotrifluoroethylene (CTFE), polymers mainly composed of tetrafluoroethylene (TFE), polymers having a fluoroalkyl group, and polymers mainly composed of a fluoroalkyl unit, and ethylene vinyl alcohol copolymers. Examples of the barrier layer 3 include a resin film provided with at least one of the deposited film and the resin layer. A plurality of the barrier layers 3 may be provided. The barrier layer 3 preferably includes a layer made of a metal material. Specific examples of the metal material constituting the barrier layer 3 include an aluminum alloy, stainless steel, titanium steel, and a steel plate. In a case where the metal material is used as a metal foil, the metal material preferably includes at least one of an aluminum alloy foil and a stainless steel foil.

From the viewpoint of improving the moldability of the exterior material for an electrical storage device, the aluminum alloy foil is more preferably, for example, a soft aluminum alloy foil composed of an annealed aluminum alloy or the like, and from the viewpoint of further improving the moldability, the aluminum alloy foil is preferably an iron-containing aluminum alloy foil. In the aluminum alloy foil containing iron (100 mass %), the content of iron is preferably 0.1 to 9.0 mass %, and more preferably 0.5 to 2.0 mass %. In a case where the content of iron is 0.1 mass % or more, an exterior material for an electrical storage device having more excellent moldability can be obtained. In a case where the content of iron is 9.0 mass % or less, it is possible to obtain an exterior material for an electrical storage device having more excellent flexibility. Examples of the soft aluminum alloy foil include an aluminum alloy foil having a composition specified in JIS H4160:1994 A8021H-O, JIS H4160:1994 A8079H-O, JIS H4000:2014 A8021P-O, or JIS H4000:2014 A8079P-O. Furthermore, if necessary, silicon, magnesium, copper, manganese, or the like may be added. Furthermore, softening can be performed by an annealing treatment or the like.

Furthermore, examples of the stainless steel foil include austenitic, ferritic, austenitic and ferritic, martensitic, and precipitation hardening stainless steel foils. Moreover, from the viewpoint of providing an exterior material for an electrical storage device having excellent moldability, the stainless steel foil is preferably made of austenitic stainless steel.

Specific examples of the austenitic stainless steel constituting the stainless steel foil include SUS304, SUS301, and SUS316L, and among these, SUS304 is particularly preferable.

In the case of a metal foil, a thickness of the barrier layer 3 may be, for example, about 9 to 200 μm as long as it exhibits a function as a barrier layer that suppresses at least infiltration of moisture. The thickness of the barrier layer 3 is preferably about 85 μm or less, more preferably about 50 μm or less, still more preferably about 40 μm or less, and particularly preferably about 35 μm or less. Furthermore, the thickness of the barrier layer 3 is preferably about 10 μm or more, more preferably about 20 μm or more, and more preferably about 25 μm or more. Furthermore, preferable ranges of the thickness of the barrier layer 3 include about 10 to 85 μm, about 10 to 50 μm, about 10 to 40 μm, about 10 to 35 μm, about 20 to 85 μm, about 20 to 50 μm, about 20 to 40 μm, about 20 to 35 μm, about 25 to 85 μm, about 25 to 50 μm, about 25 to 40 μm, and about 25 to 35 μm. In a case where the barrier layer 3 is made of an aluminum alloy foil, the above-mentioned range is particularly preferable. Furthermore, in particular in a case where the barrier layer 3 is constituted by a stainless steel foil, the thickness of the stainless steel foil is preferably about 60 μm or less, more preferably about 50 μm or less, still more preferably about 40 μm or less, still more preferably about 30 μm or less, and particularly preferably about 25 μm or less. Furthermore, the thickness of the stainless steel foil is preferably about 10 μm or more, more preferably about 15 μm or more. Furthermore, preferable ranges of the thickness of the stainless steel foil include about 10 to 60 μm, about 10 to 50 μm, about 10 to 40 μm, about 10 to 30 μm, about 10 to 25 μm, about 15 to 60 μm, about 15 to 50 μm, about 15 to 40 μm, about 15 to 30 μm, and about 15 to 25 μm.

Furthermore, in a case where the barrier layer 3 is a metal foil, a corrosion-resistant film is preferably provided at least on a surface opposite to the base material layer in order to prevent dissolution and corrosion. The barrier layer 3 may be provided with a corrosion-resistant film on both surfaces. Here, the corrosion-resistant film refers to a thin film that is obtained by subjecting the surface of the barrier layer to, for example, a hydrothermal denaturation treatment such as a boehmite treatment, a chemical conversion treatment, an anodization treatment, a plating treatment with nickel, chromium or the like, or a corrosion prevention treatment by applying a coating agent, and imparts corrosion resistance (for example, acid resistance, alkali resistance, and the like) to the barrier layer. Specifically, the corrosion-resistant coating film means a coating film that improves the acid resistance of the barrier layer (acid-resistant coating film), a coating film that improves the alkali resistance of the barrier layer (alkali-resistant coating film), and the like. The treatment for forming the corrosion-resistant coating film may be performed singly or in combination of two or more kinds thereof. Furthermore, not only one layer but also multiple layers can be formed. Moreover, among these treatments, the hydrothermal denaturation treatment and the anodization treatment are treatments in which the surface of the metal foil is dissolved with a treatment agent to form a metal compound excellent in corrosion resistance. Note that these treatments may be included in the definition of the chemical conversion treatment. Furthermore, in a case where the barrier layer 3 includes the corrosion-resistant coating, the corrosion-resistant coating is included in the barrier layer 3.

The corrosion-resistant coating film prevents delamination between a barrier layer (for example, aluminum alloy foil) and a base material layer at the time of molding an exterior material for an electrical storage device, prevents dissolution and corrosion of a surface of the barrier layer, particularly, dissolution and corrosion of aluminum oxide present on the surface of the barrier layer when the barrier layer is an aluminum alloy foil by hydrogen fluoride generated by a reaction between an electrolyte and moisture, and improves bondability (wettability) of the surface of the barrier layer, and exhibits effects of preventing delamination between the base material layer and the barrier layer at the time of heat sealing and preventing delamination between the base material layer and the barrier layer at the time of molding.

Various corrosion resistant films formed by the chemical conversion treatment are known, and examples thereof include mainly corrosion resistant films containing at least one of a phosphate, a chromate, a fluoride, a triazine thiol compound, and a rare earth oxide. Examples of the chemical conversion treatment using a phosphate or a chromate include a chromic acid chromate treatment, a phosphoric acid chromate treatment, a phosphoric acid-chromate treatment and a chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Furthermore, examples of the phosphorus compound used for these treatments include sodium phosphate, potassium phosphate, ammonium phosphate, and polyphosphoric acid. Furthermore, examples of the chromate treatment include an etching chromate treatment, an electrolytic chromate treatment, and a coating type chromate treatment, and the coating type chromate treatment is preferable. This coating type chromate treatment is a treatment in which at least the inner layer-side surface of the barrier layer (for example, aluminum alloy foil) is first subjected to a degreasing treatment by a well-known treatment method such as an alkali immersion method, an electrolytic cleaning method, an acid cleaning method, an electrolytic acid cleaning method, or an acid activation method, and then the degreased surface is coated with a treatment liquid containing, as a main component, a metal phosphate such as Cr (chromium) phosphate, a Ti (titanium) phosphate, a Zr (zirconium) phosphate, or a Zn (zinc) phosphate and a mixture of these metal salts, a treatment liquid containing, as a main component, a non-metal phosphate and a mixture of these non-metal salts, or a treatment liquid including a mixture of these and a synthetic resin or the like by a well-known coating method such as a roll coating method, a gravure printing method, or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Furthermore, examples of the resin component used at this time include polymers such as phenolic resins and acrylic resins, and examples thereof include a chromate treatment using an aminated phenol polymer having repeating units represented by the following general formulas (1) to (4). Note that, in the aminated phenol polymer, the repeating units represented by the following general formulas (1) to (4) may be contained alone or in any combination of two or more thereof. The acrylic resin is preferably polyacrylic acid, an acrylic acid methacrylic acid ester copolymer, an acrylic acid maleic acid copolymer, an acrylic acid styrene copolymer, or a derivative such as a sodium salt, an ammonium salt, or an amine salt thereof. In particular, derivatives of polyacrylic acid such as an ammonium salt, a sodium salt, or an amine salt of polyacrylic acid are preferable. In the present disclosure, polyacrylic acid means a polymer of acrylic acid. Furthermore, the acrylic resin is also preferably a copolymer of acrylic acid and a dicarboxylic acid or a dicarboxylic anhydride, and is also preferably an ammonium salt, a sodium salt, or an amine salt of a copolymer of acrylic acid and a dicarboxylic acid or a dicarboxylic anhydride. Only one acrylic resin may be used, or two or more acrylic resins may be used in combination.

[Chemical Formula 1]

(1)

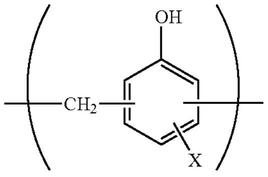

[Chemical Formula 2]

(2)

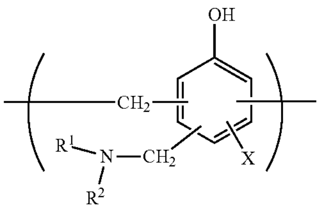

[Chemical Formula 3]

(3)

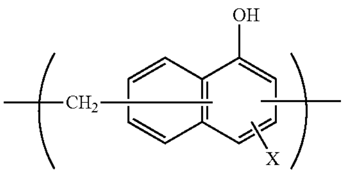

[Chemical Formula 4]

(4)

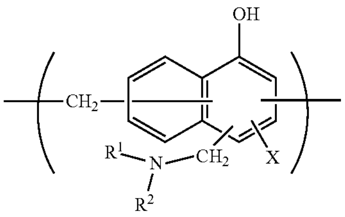

In the general formulas (1) to (4), X represents a hydrogen atom, a hydroxy group, an alkyl group, a hydroxyalkyl group, an allyl group, or a benzyl group. Furthermore, $R^1$ and $R^2$ are the same or different and each represent a hydroxy group, an alkyl group, or a hydroxyalkyl group. In the general formulas (1) to (4), examples of the alkyl group represented by X, $R^1$, and $R^2$ include linear or branched alkyl groups having 1 to 4 carbon atoms such as a methyl group, an ethyl group, a n-propyl group, an isopropyl group, a n-butyl group, an isobutyl group, and a tert-butyl group. Furthermore, examples of the hydroxyalkyl group represented by X, $R^1$, and $R^2$ include linear or branched alkyl groups having 1 to 4 carbon atoms in which one hydroxy group is substituted, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulas (1) to (4), the alkyl group and the hydroxyalkyl group represented by X, $R^1$, and $R^2$ may be the same or different. In the general formulas (1) to (4), X is preferably a hydrogen atom, a hydroxy group, or a hydroxyalkyl group. The number average molecular weight of the aminated phenol polymer having repeating units represented by the general formulas (1) to (4) is, for example, preferably about 5000000 to 1000000, more preferably about 10000000 to 20000. The aminated phenol polymer is produced, for example, by polycondensating a phenol compound or a naphthol compound with formaldehyde to produce a polymer composed of repeating units represented by the general formula (1) or the general formula (3), and then introducing a functional group ($—CH_2NR^1R^2$) into the polymer obtained above using formaldehyde and an amine ($R^1R^2NH$). The aminated phenol polymer is used singly or in combination of two or more kinds thereof.

Other examples of the corrosion resistance film include a thin film formed by a coating type corrosion preventing treatment in which a coating agent containing at least one selected from the group consisting of a rare earth element oxide sol, an anionic polymer, and a cationic polymer is applied. The coating agent may further contain phosphoric acid or a phosphate, and a crosslinking agent for crosslinking the polymer. In the rare earth element oxide sol, fine particles of a rare earth element oxide (for example, particles having an average particle diameter of 100 μm or less) are dispersed in a liquid dispersion medium. Examples of the rare earth element oxide include cerium oxide, yttrium oxide, neodymium oxide, and lanthanum oxide, and cerium oxide is preferable from the viewpoint of further improving adhesion. The rare earth element oxides contained in the corrosion resistance film can be used singly or in combination of two or more kinds thereof. As the liquid dispersion medium of the rare earth element oxide sol, for example, various solvents such as water, an alcohol-based solvent, a hydrocarbon-based solvent, a ketone-based solvent, an ester-based solvent, and an ether-based solvent can be used, and water is preferable. As the cationic polymer, for example, polyethyleneimine, an ionic polymer complex composed of a polymer having polyethyleneimine and a carboxylic acid, a primary amine-grafted acrylic resin obtained by graft-polymerizing a primary amine to an acrylic main skeleton, polyallylamine or a derivative thereof, aminated phenol, and the like are preferable. Furthermore, the anionic polymer is preferably poly (meth) acrylic acid or a salt thereof, or a copolymer containing (meth) acrylic acid or a salt thereof as a main component. Furthermore, the crosslinking agent is preferably at least one selected from the group consisting of a compound having any functional group of an isocyanate group, a glycidyl group, a carboxyl group, and an oxazoline group, and a silane coupling agent. Furthermore, the phosphoric acid or phosphate is preferably condensed phosphoric acid or condensed phosphate.

An example of the corrosion resistance film is a film formed by applying a dispersion of fine particles of a metal oxide such as aluminum oxide, titanium oxide, cerium oxide or tin oxide or barium sulfate in phosphoric acid on the surface of the barrier layer and performing a baking treatment at 150° C. or higher.

The corrosion resistance film may have a laminated structure in which at least one of a cationic polymer and an anionic polymer is further laminated as necessary. Examples of the cationic polymer and the anionic polymer include those described above.

Note that the composition of the corrosion-resistant coating can be analyzed using, for example, time-of-flight secondary ion mass spectrometry.

An amount of the corrosion-resistant film to be formed on the surface of the barrier layer 3 in the chemical conversion treatment is not particularly limited, but for example, in the case of performing a coating type chromate treatment, it is desirable that the chromic acid compound is contained in an amount of, for example, about 0.5 to 50 mg, preferably about 1.0 to 40 mg, in terms of chromium, the phosphorus compound is contained in an amount of, for example, about 0.5 to 50 mg, preferably about 1.0 to 40 mg, in terms of phosphorus, and the aminated phenol polymer is contained in an amount of, for example, about 1.0 to 200 mg, preferably about 5.0 to 150 mg, per 1 m² of the surface of the barrier layer 3.

A thickness of the corrosion-resistant coating film is not particularly limited, but it is preferably about 1 μm to 20 μm, more preferably about 1 μm to 100 μm, and still more preferably about 1 μm to 50 μm from the viewpoint of the cohesive force of the coating film and the adhesive force with the barrier layer and the heat-sealable resin layer. Note that the thickness of the corrosion-resistant coating film can be measured by observation with a transmission electron microscope or a combination of observation with a transmission electron microscope and energy dispersive X-ray spectroscopy or electron beam energy loss spectroscopy. By analyzing the composition of the corrosion-resistant coating film using time-of-flight secondary ion mass spectrometry, peaks derived from, for example, secondary ions composed of Ce, P, and O (for example, at least one of $Ce_2PO_4^+$, $CePO_4^-$, and the like), and secondary ions composed of, for example, Cr, P, and O (for example, at least one of $CrPO_2^+$, $CrPO_4^-$, and the like) are detected.

The chemical conversion treatment is performed by applying a solution containing a compound to be used for formation of the corrosion-resistant film to the surface of the barrier layer by a bar coating method, a roll coating method, a gravure coating method, an immersion method or the like, and then heating the barrier layer so that the temperature of the barrier layer is about 70 to 200° C. Furthermore, before the barrier layer is subjected to the chemical conversion treatment, the barrier layer may be subjected to a degreasing treatment by an alkali immersion method, an electrolytic cleaning method, an acid cleaning method, an electrolytic acid cleaning method, or the like in advance. By performing the degreasing treatment in this manner, the chemical conversion treatment of the surface of the barrier layer can be more efficiently performed. Furthermore, by using an acid degreasing agent in which a fluorine-containing compound is dissolved with an inorganic acid for the degreasing treatment, it is possible to form not only the degreasing effect of the metal foil but also a passivation metal fluoride. In such a case, only the degreasing treatment may be performed.

[Heat-Sealable Resin Layer 4]

In the exterior material for an electrical storage device of the present disclosure, the heat-sealable resin layer 4 corresponds to the innermost layer, and is a layer (sealant layer) that exerts a function of sealing the electrical storage device element by heat-sealing the heat-sealable resin layers at the time of assembling the electrical storage device.

In the exterior material for an electrical storage device according to the first embodiment of the present disclosure, a melting peak temperature of 130° C. or lower is observed in the heat-sealable resin layer 4. From the viewpoint of more suitably exhibiting the effect of the invention of the present disclosure, the melting peak temperature is preferably about 100° C. or higher, more preferably about 110° C. or higher, and still more preferably about 120° C. or higher. Preferable ranges of the melting peak temperature include about 100 to 130° C., about 110 to 130° C., and about 120 to 130° C. The number of melting peak temperatures may be one or more. Furthermore, when a melting peak temperature of 130° C. or lower is observed in heat-sealable resin layer 4, a melting peak temperature exceeding 130° C. may be further observed. However, from the viewpoint of more suitably exhibiting the effect of the invention of the present disclosure, all melting peak temperatures observed in the heat-sealable resin layer 4 are preferably 130° C. or less. In the exterior material for an electrical storage device according to the second embodiment, it is not essential that these melting peak temperatures are observed in the heat-sealable resin layer 4, but it is preferable that these melting peak temperatures are observed as in the first embodiment. A method of measuring the melting peak temperature is as follows.

(Measurement of Melting Peak Temperature)

A heat-sealable resin layer is obtained from an exterior material for an electrical storage device, and a measurement sample is obtained. The melting peak temperature of the measurement sample is measured in accordance with JIS K7121:2012 (Testing Methods for Transition Temperatures of Plastics (Supplement 1 of JIS K7121:1987)). The measurement is performed using a differential scanning calorimeter (DSC, e.g. a differential scanning calorimeter Q200 from TA Instruments).

The resin constituting the heat-sealable resin layer 4 can be heat-sealed, and contains a polyolefin backbone in the first embodiment. Furthermore, in the second embodiment, the resin constituting the heat-sealable resin layer 4 does not need to contain a polyolefin backbone, but preferably contains a polyolefin backbone. Examples of the resin containing a polyolefin backbone include polyolefins and acid-modified polyolefins. Whether the resin constituting the heat-sealable resin layer 4 contains a polyolefin backbone can be analyzed by, for example, infrared spectroscopy, gas chromatography mass spectrometry, or the like. Furthermore, when the resin constituting the heat-sealable resin layer 4 is analyzed by infrared spectroscopy, a peak derived from maleic anhydride is preferably detected. For example, when maleic anhydride-modified polyolefin is measured by infrared spectroscopy, peaks derived from maleic anhydride are detected in the vicinity of a wave number of 1760 cm⁻¹ and in the vicinity of a wave number of 1780 cm'. In a case where the heat-sealable resin layer 4 is a layer composed of a maleic anhydride-modified polyolefin, a peak derived from maleic anhydride is detected as measured by infrared spectroscopy. However, when the acid modification degree is low, the peak becomes small and may not be detected. In that case, it can be analyzed by nuclear magnetic resonance spectroscopy.

Specific examples of the polyolefin include polyethylene such as low-density polyethylene, medium-density polyethylene, high-density polyethylene, and linear low-density polyethylene; ethylene-α-olefin copolymer; polypropylene, such as homopolypropylene, block copolymers of polypropylene (for example, a block copolymer of propylene and ethylene), random copolymers of polypropylene (for example, a random copolymer of propylene and ethylene); propylene-α-olefin copolymer; terpolymers of ethylene-butene-propylene. Among them, polypropylene is preferable. The polyolefin resin in the case of a copolymer may be a block copolymer or a random copolymer. These polyolefin-based resins may be used alone or in combination of two or more thereof.

Furthermore, the polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene, and isoprene. Furthermore, examples of the cyclic monomer as a constituent monomer of the cyclic polyolefin include cyclic alkenes such as norbornene; examples thereof include cyclic dienes such as cyclopentadiene, dicyclopentadiene, cyclohexadiene and norbornadiene. Among them, cyclic alkenes are preferable, and norbornene is more preferable.

The acid-modified polyolefin is a polymer obtained by modifying a polyolefin by block polymerization or graft polymerization with an acid component. As the polyolefin to be acid-modified, the above-mentioned polyolefin, a copolymer obtained by copolymerizing polar molecules such as acrylic acid or methacrylic acid with the above-mentioned polyolefin, a polymer such as a crosslinked polyolefin, or the like can also be used. Furthermore, examples of the acid component used for the acid modification include carboxylic acids such as maleic acid, acrylic acid, itaconic acid, crotonic acid, maleic anhydride, and itaconic anhydride, and anhydrides thereof.

The acid-modified polyolefin may be an acid-modified cyclic polyolefin. The acid-modified cyclic polyolefin is a polymer obtained by copolymerizing a part of monomers constituting the cyclic polyolefin in place of an acid component, or by block-polymerizing or graft-polymerizing an acid component with respect to the cyclic polyolefin. The cyclic polyolefin to be acid-modified is the same as described above. Furthermore, the acid component used for the acid modification is the same as the acid component used for the modification of the polyolefin.

Preferable examples of the acid-modified polyolefin include a polyolefin modified with a carboxylic acid or an anhydride thereof, a polypropylene modified with a carboxylic acid or an anhydride thereof, a maleic anhydride-modified polyolefin, and a maleic anhydride-modified polypropylene.

The heat-sealable resin layer 4 may be formed of one type of resin alone, or may be formed of a blend polymer obtained by combining two or more types of resins. Moreover, the heat-sealable resin layer 4 may be formed of only one layer, or may be formed of two or more layers of the same or different resins.

Furthermore, the heat-sealable resin layer 4 may contain a slipping agent or the like as necessary. When the heat-sealable resin layer 4 contains a slipping agent, moldability of the exterior material for an electrical storage device can be enhanced. The slipping agent is not particularly limited, and a known slipping agent can be used. The slipping agent may be used alone, or may be used in combination of two or more thereof.

The slipping agent is not particularly limited, but an amide-based slipping agent is preferable. Specific examples of the slipping agent include those exemplified for the base material layer 1. The slipping agent may be used alone, or may be used in combination of two or more thereof.

In a case where the slipping agent is present on the surface of the heat-sealable resin layer 4, an amount of the slipping agent present is not particularly limited, but is preferably about 10 to 50 mg/m$^2$, more preferably about 15 to 40 mg/m$^2$ for improving the moldability of the exterior material for an electrical storage device.

The slipping agent present on the surface of the heat-sealable resin layer 4 may be obtained by exuding the slipping agent contained in the resin constituting the heat-sealable resin layer 4, or may be obtained by applying the slipping agent to the surface of the heat-sealable resin layer 4.

Furthermore, a thickness of the heat-sealable resin layer 4 is not particularly limited as long as the heat-sealable resin layers are heat-sealed with each other to exhibit a function of sealing the electrical storage device element, and is, for example, about 100 μm or less, preferably about 85 μm or less, more preferably about 15 to 85 μm. Note that, for example, in a case where the thickness of the adhesive layer 5 to be described later is 10 μm or more, the thickness of the heat-sealable resin layer 4 is preferably about 85 μm or less, more preferably about 15 to 45 μm, and for example, in a case where the thickness of the adhesive layer 5 to be described later is less than 10 μm or in a case where the adhesive layer 5 is not provided, the thickness of the heat-sealable resin layer 4 is preferably about 20 μm or more, more preferably about 35 to 85 μm.

[Adhesive Layer 5]

In the exterior material for an electrical storage device of the present disclosure, the adhesive layer 5 is a layer provided between the barrier layer 3 (or the corrosion-resistant film) and the heat-sealable resin layer 4 in order to firmly adhere the barrier layer 3 and the heat-sealable resin layer 4 to each other.

In the exterior material for an electrical storage device according to the first embodiment of the present disclosure, a melting peak of the adhesive layer 5 is observed at 135° C. or higher. From the viewpoint of more suitably exhibiting the effect of the invention of the present disclosure, the melting peak temperature is preferably 140° C. or higher, and more preferably 150° C. or higher. Furthermore, from the same viewpoint, the melting peak temperature is preferably 170° C. or lower. A preferable temperature range of the melting peak temperature is preferably about 135 to 170° C., more preferably about 140 to 170° C., and still more preferably about 150 to 170° C. The number of melting peak temperatures may be one or more. Furthermore, when a melting peak temperature of 135° C. or higher is observed in the adhesive layer 5, a melting peak temperature of less than 135° C. may be further observed. However, from the viewpoint of more suitably exhibiting the effect of the invention of the present disclosure, all melting peak temperatures observed in the adhesive layer 5 are preferably 135° C. or higher. Furthermore, in the exterior material for an electrical storage device according to the second embodiment, it is not essential that these melting peak temperatures are observed in the adhesive layer 5, but it is preferable that these melting peak temperatures are observed as in the first embodiment. The melting peak temperature is measured by the method described in the above section (Measurement of melting peak temperature) except that the adhesive layer is acquired from the exterior material for an electrical storage device and a measurement sample is taken.

The adhesive layer 5 is formed of a resin capable of bonding the barrier layer 3 and the heat-sealable resin layer 4. In the first embodiment, the adhesive layer 5 includes a polyolefin backbone. Furthermore, in the second embodiment, the adhesive layer 5 does not need to contain a polyolefin backbone, but preferably contains a polyolefin backbone. Examples of the resin forming the adhesive layer 5 include the polyolefin and the acid-modified polyolefin exemplified for the heat-sealable resin layer 4 described above. On the other hand, from the viewpoint of firmly bonding the barrier layer 3 and the adhesive layer 5, the adhesive layer 5 preferably contains an acid-modified polyolefin. Examples of the acid-modifying component include dicarboxylic acids such as maleic acid, itaconic acid, succinic acid, and adipic acid, anhydrides thereof, acrylic acid, methacrylic acid, and the like, and maleic anhydride is most preferable from the viewpoint of ease of modification, general-purpose property, and the like. Furthermore, from the viewpoint of the heat resistance of the exterior material for an electrical storage device, the olefin component is preferably a polypropylene-based resin, and the adhesive layer 5 most preferably contains maleic anhydride-modified polypropylene.

Whether the resin constituting the adhesive layer 5 contains a polyolefin backbone can be analyzed by, for example, infrared spectroscopy, gas chromatography mass spectrometry, or the like, and the analysis method is not particularly limited. Furthermore, the fact that the resin constituting the adhesive layer 5 contains an acid-modified polyolefin means that, for example, when a maleic anhydride-modified polyolefin is measured by infrared spectroscopy, peaks derived from maleic anhydride are detected in the vicinity of a wave number of 1760 $cm^{-1}$ and in the vicinity of a wave number of 1780 $cm^{-1}$. However, when the acid modification degree is low, the peak becomes small and may not be detected. In that case, it can be analyzed by nuclear magnetic resonance spectroscopy.

A thickness of the adhesive layer 5 is preferably about 60 μm or less, about 50 μm or less, or about 45 μm or less. Furthermore, the thickness of the adhesive layer 5 is preferably about 10 μm or more, about 20 μm or more, about 25 μm or more, or about 30 μm or more. Furthermore, a range of the thickness of the adhesive layer 5 is preferably about 10 to 60 μm, about 10 to 50 μm, about 10 to 45 μm, about 20 to 60 μm, about 20 to 50 μm, about 20 to 45 μm, about 25 to 60 μm, about 25 to 50 μm, about 25 to 45 μm, about 30 to 60 μm, about 30 to 50 μm, or about 30 to 45 μm. The adhesive layer 5 can be formed by, for example, extrusion molding of the heat-sealable resin layer 4 and the adhesive layer 5.

[Surface Coating Layer 6]

The exterior material for an electrical storage device of the present disclosure may include a surface coating layer 6 on the base material layer 1 (a side of the base material layer 1 opposite to the barrier layer 3) as necessary for the purpose of improving at least one of designability, electrolytic solution resistance, scratch resistance, moldability, and the like. The surface coating layer 6 is a layer positioned on an outermost layer side of the exterior material for an electrical storage device when the electrical storage device is assembled using the exterior material for an electrical storage device.

The surface coating layer 6 can be formed of, for example, a resin such as polyvinylidene chloride, polyester, polyurethane, an acrylic resin, or an epoxy resin.

In a case where the resin forming the surface coating layer 6 is a curable resin, the resin may be either a one-liquid curable type or a two-liquid curable type, but is preferably a two-liquid curable type. Examples of the two-liquid curable resin include two-liquid curable polyurethane, two-liquid curable polyester, and two-liquid curable epoxy resin. Among them, two-liquid curable polyurethane is preferable.

Examples of the two-component curable polyurethane include polyurethane containing a first agent containing a polyol compound and a second agent containing an isocyanate compound. Preferable examples thereof include two-component curable polyurethanes in which a polyol such as a polyester polyol, a polyether polyol, or an acrylic polyol is used as a first agent and an aromatic or aliphatic polyisocyanate is used as a second agent. Furthermore, examples of the polyurethane include polyurethane containing a polyurethane compound obtained by reacting a polyol compound with an isocyanate compound in advance and an isocyanate compound. Examples of the polyurethane include polyurethane containing a polyurethane compound obtained by reacting a polyol compound with an isocyanate compound in advance and a polyol compound. Examples of the polyurethane include polyurethane obtained by curing a polyurethane compound obtained by reacting a polyol compound and an isocyanate compound in advance by reacting the polyurethane compound with moisture in the air or the like. As the polyol compound, it is preferable to use a polyester polyol having a hydroxyl group in the side chain in addition to the hydroxyl group at the terminal of the repeating unit. Examples of the second agent include aliphatic, alicyclic, aromatic, and araliphatic isocyanate-based compounds. Examples of the isocyanate-based compound include hexamethylene diisocyanate (HDI), xylylene diisocyanate (XDI), isophorone diisocyanate (IPDI), hydrogenated XDI (H6XDI), hydrogenated MDI (H12MDI), tolylene diisocyanate (TDI), diphenylmethane diisocyanate (MDI), and naphthalene diisocyanate (NDI). Furthermore, a polyfunctional isocyanate-modified product of one or two or more of these diisocyanates can be mentioned. Furthermore, as the polyisocyanate compound, a multimer (for example, a trimer) can also be used. Examples of such a multimer include adducts, biurets, and nurates. Note that the aliphatic isocyanate-based compound refers to an isocyanate having an aliphatic group and having no aromatic ring, the alicyclic isocyanate-based compound refers to an isocyanate having an alicyclic hydrocarbon group, and the aromatic isocyanate-based compound refers to an isocyanate having an aromatic ring. Since the surface coating layer 6 is formed of polyurethane, excellent electrolytic solution resistance is imparted to an exterior material for an electrical storage device.

The surface coating layer 6 may contain additives such as the above-described slipping agent, an anti-blocking agent, a matting agent, a flame retardant, an antioxidant, a tackifier, and an anti-static agent on at least one of the surface and the inside of the surface coating layer 6 as necessary according to the surface coating layer 6, the functionality to be provided to the surface thereof, and the like. Examples of the additive include fine particles having an average particle diameter of about 0.5 μm to 5 μm. An average particle diameter of the additive is a median diameter measured by a laser diffraction/scattering particle diameter distribution measuring apparatus.

The additive may be either an inorganic substance or an organic substance. Furthermore, a shape of the additive is not particularly limited, and examples thereof include a spherical shape, a fibrous shape, a plate shape, an amorphous shape, and a scaly shape.

Specific examples of the additive include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotube, high melting point nylon, acrylate resin, crosslinked acrylic, crosslinked styrene, crosslinked polyethylene, benzoguanamine, gold, aluminum, copper, nickel, and the like. The additives may be used alone, or may be used in combination of two or more thereof. Among these additives, silica, barium sulfate, and titanium oxide are preferable from the viewpoint of dispersion stability, cost, and the like. Furthermore, the surface of the additive may be subjected to various surface treatments such as an insulation treatment and a dispersibility enhancing treatment.

A method of forming the surface coating layer 6 is not particularly limited, and examples thereof include a method of applying a resin for forming the surface coating layer 6. In a case where an additive is blended in the surface coating layer 6, a resin mixed with the additive may be applied.

A thickness of the surface coating layer 6 is not particularly limited as long as the function as the surface coating layer 6 is performed, and is, for example, about 0.5 to 10 μm, preferably about 1 to 5 μm.

3. Method of Manufacturing Exterior Material for Electrical Storage Device

The method of manufacturing the exterior material for an electrical storage device is not particularly limited as long as a laminate in which the layers included in the exterior material for an electrical storage device of the present invention are laminated is obtained, and examples thereof include a method including a step of laminating at least the base material layer 1, the barrier layer 3, and the heat-sealable resin layer 4 in this order. That is, the method of manufacturing the exterior material for an electrical storage device of the present invention includes a step of obtaining a laminate by laminating at least a base material layer, a barrier layer, an adhesive layer and a heat-sealable resin layer in this order, in which the heat-sealable resin layer has a melting peak temperature observed at 130° C. or lower, the adhesive layer has a melting peak temperature observed at 135° C. or higher, the heat-sealable resin layer has a polyolefin backbone, and the adhesive layer has a polyolefin backbone.

An example of a method of manufacturing the exterior material for an electrical storage device of the present invention is as follows. First, a laminate (Hereinafter, it may be referred to as a "laminate A") in which the base material layer 1, the adhesive agent layer 2, and the barrier layer 3 are laminated in this order is formed. Specifically, the laminate A can be formed by a dry lamination method in which an adhesive used for forming the adhesive agent layer 2 is applied onto the base material layer 1 or the barrier layer 3 whose surface is subjected to a chemical conversion treatment as necessary by a coating method such as a gravure coating method or a roll coating method, dried, and then the barrier layer 3 or the base material layer 1 is laminated to cure the adhesive agent layer 2.

Next, the adhesive layer 5 and the heat-sealable resin layer 4 are laminated on the barrier layer 3 of the laminate A. For example, (1) a method of laminating the adhesive layer 5 and the heat-sealable resin layer 4 on the barrier layer 3 of the laminate A by extruding the adhesive layer 5 and the heat-sealable resin layer 4 (co-extrusion lamination method, tandem lamination method), (2) a method of separately forming a laminate in which the adhesive layer 5 and the heat-sealable resin layer 4 are laminated on the barrier layer 3 of the laminate A and laminating the laminate on the barrier layer 3 of the laminate A by a thermal lamination method, or a method of forming a laminate in which the adhesive layer 5 is laminated on the barrier layer 3 of the laminate A and laminating the laminate on the heat-sealable resin layer 4 by a thermal lamination method, or (3) a method of laminating the laminate A and the heat-sealable resin layer 4 with the adhesive layer 5 interposed therebetween while pouring the melted adhesive layer 5 between the barrier layer 3 of the laminate A and the heat-sealable resin layer 4 previously formed in a sheet form (sandwich lamination method), (4) a method in which an adhesive for forming the adhesive layer 5 is applied by solution coating onto the barrier layer 3 of the laminate A and dried, or further laminated by a baking method or the like, and the heat-sealable resin layer 4 formed in a sheet form in advance is laminated on the adhesive layer 5.

In a case where the surface coating layer 6 is provided, the surface coating layer 6 is laminated on the surface of the base material layer 1 on a side opposite to the barrier layer 3. The surface coating layer 6 can be formed, for example, by applying the above-mentioned resin for forming the surface coating layer 6 to the surface of the base material layer 1. Note that the order of the step of laminating the barrier layer 3 on the surface of the base material layer 1 and the step of laminating the surface coating layer 6 on the surface of the base material layer 1 is not particularly limited. For example, after the surface coating layer 6 is formed on the surface of the base material layer 1, the barrier layer 3 may be formed on the surface of the base material layer 1 on the side opposite to the surface coating layer 6.

As described above, a laminate including the surface coating layer 6 provided as necessary, the base material layer 1, the adhesive agent layer 2 provided as necessary, the barrier layer 3, the adhesive layer 5 and the heat-sealable resin layer 4 in this order is formed, and the laminate may be further subjected to a heating treatment in order to strengthen the bondability of the adhesive agent layer 2 provided as necessary and the adhesive layer 5.

In the exterior material for an electrical storage device, each layer constituting the laminate may be subjected to a surface activation treatment such as a corona treatment, a blast treatment, an oxidation treatment, or an ozone treatment as necessary to improve processing suitability. For example, by applying a corona treatment to the surface of the base material layer 1 on a side opposite to the barrier layer 3, the printability of the ink to the surface of the base material layer 1 can be improved.

4. Application of Exterior Material for Electrical Storage Device

The exterior material for an electrical storage device of the present disclosure is used in a packaging for hermetically sealing and accommodating electrical storage device elements such as a positive electrode, a negative electrode, and an electrolyte. That is, an electrical storage device element including at least a positive electrode, a negative electrode and an electrolyte can be accommodated in a packaging formed of the exterior material for an electrical storage device of the present disclosure to form an electrical storage device.

Specifically, an electrical storage device element including at least a positive electrode, a negative electrode, and an electrolyte is covered with the exterior material for an electrical storage device of the present disclosure such that a flange portion (a region where the heat-sealable resin layers are in contact with each other) can be formed on a peripheral edge of the electrical storage device element in a state where a metal terminal connected to each of the positive electrode and the negative electrode protrudes outward, and the heat-sealable resin layers of the flange portion are heat-sealed with each other to hermetically seal the electrical storage device element, thereby providing an electrical storage device using the exterior material for an electrical storage device. Note that in a case where the electrical storage device element is accommodated in the packaging formed of the exterior material for an electrical storage device of the present disclosure, the packaging is formed such that a part of the heat-sealable resin of the exterior material for an electrical storage device of the present disclosure is on an inner side (surface in contact with the electrical storage device element). The two heat-sealable resin layers of the exterior material for an electrical storage device may be overlapped with each other while facing each other, and the peripheral edge parts of the exterior material for an electrical storage device may be heat-sealed to form a packaging. Alternatively, as in the example illustrated in FIG. 4, one exterior material for an electrical storage device may be folded back and overlapped, and the peripheral edge parts may be heat-sealed to form a packaging. In the case of folding back and superimposing, as in the example illustrated in FIG. 4, the packaging may be formed by heat-sealing sides other than the folded side and a three-way seal, or may be folded back and sealed in four so that a flange portion can be formed. Furthermore, in the exterior material for an electrical storage device, a concave portion for accommodating the electrical storage device element may be formed by deep drawing molding or overhanging molding. As in the example illustrated in FIG. 4, a concave portion may be provided in one of the exterior materials for an electrical storage device, and a concave portion may not be provided in the other exterior material for an electrical storage device, and a concave portion may also be provided in the other exterior material for an electrical storage device.

The exterior material for an electrical storage device of the present disclosure can be suitably used for an electrical storage device such as a battery (includes a capacitor, and the like). Furthermore, the exterior material for an electrical storage device of the present disclosure may be used for either a primary battery or a secondary battery, but is preferably used for a secondary battery. The type of the secondary battery to which the exterior material for an electrical storage device of the present disclosure is applied is not particularly limited, and examples thereof include a lithium ion battery, a lithium ion polymer battery, an all-solid-state battery, a lead-acid battery, a nickel-hydrogen storage battery, a nickel-cadmium storage battery, a nickel-iron storage battery, a nickel-zinc storage battery, a silver oxide-zinc storage battery, a metal-air battery, a multivalent cation battery, a capacitor, and a capacitor. Among these secondary batteries, preferred objects to which the exterior material for an electrical storage device of the present disclosure is applied include lithium ion batteries and lithium ion polymer batteries.

EXAMPLES

Hereinafter, the present disclosure will be described in detail with reference to Examples and Comparative Examples. However, the present disclosure is not limited to Examples.

<Manufacturing of Exterior Material for Electrical Storage Device>

Examples 1 to 2 and Comparative Examples 1 to 2

A stretched nylon (ONy) film (thickness: 25 μm) was prepared as a base material layer. Furthermore, an aluminum foil (JIS H4160:1994 A8021H-O (thickness 40 μm)) was prepared as a barrier layer. Next, the base material layer and the barrier layer were bonded by a dry lamination method using a two-liquid urethane adhesive (polyol compound and aromatic isocyanate-based compound), and an aging treatment was performed to prepare a laminate of base material layer (thickness 25 μm)/adhesive agent layer (thickness after curing: 3 μm)/barrier layer (thickness 40 μm). Both surfaces of the aluminum foil are subjected to a chemical conversion treatment. The chemical conversion treatment of the aluminum foil was performed by applying a treatment liquid containing a phenol resin, a chromium fluoride compound and phosphoric acid to both surfaces of the aluminum foil by a roll coating method in such a manner that the application amount of chromium was 10 mg/$m^2$ (dry mass), and baking the aluminum foil.

Next, on the barrier layer of the laminate obtained as described above, maleic anhydride-modified polypropylene (PPa1 or PPa2 in Table 1, respectively) as an adhesive layer (thickness: 23 μm) and random polypropylene (PP1, PP2, or PP3 in Table 1, respectively) as a heat-sealable resin layer (thickness: 22 μm) were co-extruded onto the barrier layer to obtain an exterior material for an electrical storage device in which a base material layer (thickness: 25 μm), an adhesive agent layer (3 μm), a barrier layer (40 μm), an adhesive layer (23 μm) and a heat-sealable resin layer (22 μm) were laminated in this order.

The melting peak temperatures of the adhesive layer and the heat-sealable resin layer of Examples 1 to 2 and Comparative Examples 1 to 2 are as illustrated in Table 1. Furthermore, the melting peak temperature was measured by the following method.

(Measurement of Melting Peak Temperature)

An adhesive layer and a heat-sealable resin layer were obtained from the exterior material for an electrical storage device, and used as measurement samples. For each measurement sample, the melting peak temperature was measured in accordance with the provision of JIS K7121:2012 (Testing Methods for Transition Temperatures of Plastics (Supplement 1 of JIS K7121:1987)). The measurement was performed using a differential scanning calorimeter (DSC, differential scanning calorimeter Q200 manufactured by TA Instruments).

(Measurement of Heat-Sealing Strength)

In accordance with the provision of JIS K7127:1999, the sealing strength of the exterior material for an electrical storage device was measured as follows. As a test piece, the exterior material for an electrical storage device which was cut into a strip shape having a width of 15 mm in the transverse direction was prepared. Specifically, as illustrated in FIG. 5, first, each exterior material for an electrical storage device was cut into a size of 60 mm (transverse direction)×200 mm (machine direction) (FIG. 5*a*). Next, the exterior material for an electrical storage device was folded in half in the machine direction at the position of the fold P (intermediate in the machine direction) such that the heat-sealable resin layers faced each other (FIG. 5*b*). The heat-sealable resin layers were heat-sealed to each other on an inner side in the machine direction of about 10 mm from the fold P under conditions of a seal width of 7 mm, a temperature of 120° C. or 190° C., a surface pressure of 1.0 MPa, and 3 seconds (FIG. 5*c*). In FIG. 5*c*, a shaded part S is a heat-sealed part. Next, the test piece was obtained by cutting in the machine direction (cutting at the position of the two-dot chain line in FIG. 5*d*) so that the width in the transverse direction was 15 mm (FIG. 5*e*). Next, the test piece 13 was left standing in an environment of 25° C. for 2 minutes, and the heat-sealable resin layer at the heat-sealed part was delaminated at a rate of 300 mm/min with a tensile tester (AG-Xplus (trade name) manufactured by SHIMADZU CORPORATION) in an environment of 25° C. (FIG. 6). The maximum strength at the time of delamination was defined as a heat-sealing strength (N/15 mm). A distance between chucks is 50 mm. An average value measured three times was used. The results are illustrated in Table 1.

(Measurement of Martens Hardness)

On the basis of an indentation method, at a measurement temperature (sample temperature) of 25° C., a Vickers indenter was pushed to a depth of 1 μm in the thickness direction from the surface on the side of the heat-sealable resin layer of each exterior material for an electrical storage device, and the Martens hardness was measured. The measurement conditions are as follows. The Martens hardness was calculated from the load-displacement curve obtained by the pushing of the Vickers indenter. As a measurement value, an average obtained for 10 portions of the surface on the side of the heat-sealable resin layer was adopted. The Martens hardness is determined by calculating the surface area A ($mm^2$) of the Vickers indenter at the maximum depth of indentation, and dividing the maximum load F(N) by the surface area A ($mm^2$) (F/A). As a measuring device, PICODENTER HM-500 manufactured by Fischer Instruments was used. The exterior material for an electrical storage device was bonded to one surface of a slide glass (76 mm×26 mm×1 mm) to which a double-sided adhesive tape was attached such that the heat-sealable resin layer side was on the opposite side of the slide glass to prepare a measurement sample. Next, the surface hardness of the surface of the measurement sample on the heat-sealable resin layer side was measured.

<Measurement Conditions>

Indenter: Vickers (facing angle 136° of a tip part of quadrangular pyramid)

Measurement temperature (sample temperature): 25° C.

Speed: 1.000 μm/10 sec

Measurement depth: 1.0 μm

Retention time: 5 sec

Speed of return from pushing: 1.000 μm/10 sec (Unsealing Test)

The exterior material for an electrical storage device was cut into a size of 100 mm×200 mm, and folded back at a center position of the long side of the exterior material for an electrical storage device so that the heat-sealable resin layers faced each other. Next, the short side was heat-sealed under conditions of a temperature of 120° C., a surface pressure of 1.0 MPa, 3 seconds, and a seal width of 7 mm. Moreover, one long side was heat-sealed in the same manner, 2.0 g of water was put in a bag-shaped sample, and then the open side (long side) was heat-sealed in the same manner in a state where the air inside was degassed to obtain a test sample in which water was sealed. The test sample was placed in an oven and allowed to stand in an environment of 105° C. for 8 hours to check whether or not the test sample had been opened. The results are illustrated in Table 1. When stored in an environment of 105° C., the internal pressure rises to about 120 kPa due to vaporization of water.

TABLE 1

| | Melting peak temperature (° C.) | | Heat-sealing strength (N/15 mm) | | Martens hardness of heat-sealable resin layer at 25° C. (MPa) | Presence or absence of opening after 8 hours at 105° C. |
|---|---|---|---|---|---|---|
| | Adhesive layer (resin) | Heat-sealable resin layer (resin) | Heat-seal at 120° C. | Heat-seal at 190° C. | | |
| Example 1 | 160 (PPa1) | 125 (PP1) | 42 | 105 | 52.0 | Absence |
| Example 2 | 160 (PPa1) | 125 (PP2) | 43 | 108 | 47.9 | Absence |
| Comparative example 1 | 127 (PPa2) | 140 (PP3) | 13 | 119 | 25.2 | Presence |
| Comparative example 2 | 160 (PPa1) | 140 (PP3) | 3 | 120 | 24.4 | Presence |

In the exterior material for an electrical storage device of Examples 1 to 2, the heat-sealable resin layer was observed to have a melting peak temperature of 130° C. or lower, the adhesive layer was observed to have a melting peak temperature of 135° C. or higher, and the resins constituting the heat-sealable resin layer and the adhesive layer each had a polyolefin backbone. Furthermore, the exterior materials for an electrical storage device of Examples 1 to 2 have a Martens hardness of 30.0 MPa or more as measured by pressing a Vickers indenter to a depth of 1 μm in the thickness direction from the surface on the side of the heat-sealable resin layer. In the exterior materials for an electrical storage device of Examples 1 to 2, the heat-sealable resin layers are heat-sealed with each other at a temperature (for example, about 120° C.) lower than a conventional heat-sealing temperature (about 200° C.) to form an electrical storage device having high adhesion strength, and the exterior material for an electrical storage device is not opened even when the electrical storage device is exposed to an environment of about 100° C.

As described above, the present disclosure provides the invention of the following aspects.

Item 1. An exterior material for an electrical storage device, the exterior material including a laminate provided with at least a base material layer, a barrier layer, an adhesive layer, and a heat-sealable resin layer in this order, wherein the heat-sealable resin layer has a melting peak temperature observed at 130° C. or lower, the adhesive layer has a melting peak temperature observed at 135° C. or higher, a resin constituting the heat-sealable resin layer has a polyolefin backbone, and a resin constituting the adhesive layer has a polyolefin backbone.

Item 2. An exterior material for an electrical storage device, the exterior material including a laminate provided with at least a base material layer, a barrier layer, an adhesive layer, and a heat-sealable resin layer in this order, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

Item 3. The exterior material for an electrical storage device according to item 1, wherein a Martens hardness is 25.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

Item 4. The exterior material for an electrical storage device according to any one of items 1 to 3, wherein the exterior material for an electrical storage device has a heat-sealing strength of 35 N/15 mm or more in heat-sealing strength measurement in which the heat-sealable resin layers are heat-sealed to each other under conditions of a temperature of 120° C., a surface pressure of 1.0 MPa, and 3 seconds, and the heat-sealable resin layers are delaminated from each other.

Item 5. The exterior material for an electrical storage device according to item 4, wherein the exterior material for an electrical storage device has a heat-sealing strength of 80 N/15 mm or more in heat-sealing strength measurement in which the heat-sealable resin layers are heat-sealed to each other under conditions of a temperature of 190° C., a surface pressure of 1.0 MPa, and 3 seconds, and the heat-sealable resin layers are delaminated from each other.

Item 6. The exterior material for an electrical storage device according to any one of items 1 to 5, wherein a resin constituting the heat-sealable resin layer contains polypropylene.

Item 7. The exterior material for an electrical storage device according to any one of items 1 to 6, wherein a resin constituting the adhesive layer contains acid-modified polypropylene.

Item 8. A method of manufacturing an exterior material for an electrical storage device, the method comprising a step of laminating at least a base material layer, a barrier layer, an adhesive layer, and a heat-sealable resin layer in this order to obtain a laminate, wherein the heat-sealable resin layer has a melting peak temperature observed at 130° C. or lower, the adhesive layer has a melting peak temperature observed at 135° C. or higher, a resin constituting the heat-sealable resin layer has a polyolefin backbone, and a resin constituting the adhesive layer has a polyolefin backbone.

Item 9. A method of manufacturing an exterior material for an electrical storage device, the method comprising a step of laminating at least a base material layer, a barrier layer, an adhesive layer, and a heat-sealable resin layer in this order to obtain a laminate, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

Item 10. An electrical storage device in which an electrical storage device element including at least a positive electrode, a negative electrode and an electrolyte is housed in a packaging formed of an exterior material for an electrical storage device according to any one of items 1 to 7.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Exterior material for electrical storage device

The invention claimed is:

1. An exterior material for an electrical storage device, the exterior material including a laminate provided with at least a base material layer, a barrier layer, an adhesive layer, and a heat-sealable resin layer in this order, wherein the heat-sealable resin layer has a melting peak temperature observed at 130° C. or lower, the adhesive layer has a melting peak temperature observed at 135° C. or higher, a resin constituting the heat-sealable resin layer has a polyolefin backbone, a resin constituting the adhesive layer has a polyolefin backbone, and a Martens hardness is 25.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

2. The exterior material for an electrical storage device according to claim 1, wherein the exterior material for an electrical storage device has a heat-sealing strength of 35 N/15 mm or more in heat-sealing strength measurement in which the heat-sealable resin layers are heat-sealed to each other under conditions of a temperature of 120° C., a surface pressure of 1.0 MPa, and 3 seconds, and the heat-sealable resin layers are delaminated from each other.

3. The exterior material for an electrical storage device according to claim 2, wherein the exterior material for an electrical storage device has a heat-sealing strength of 80 N/15 mm or more in heat-sealing strength measurement in which the heat-sealable resin layers are heat-sealed to each other under conditions of a temperature of 190° C., a surface pressure of 1.0 MPa, and 3 seconds, and the heat-sealable resin layers are delaminated from each other.

4. The exterior material for an electrical storage device according to claim 1, wherein a resin constituting the heat-sealable resin layer contains polypropylene.

5. The exterior material for an electrical storage device according to claim 1, wherein a resin constituting the adhesive layer contains acid-modified polypropylene.

6. The exterior material for an electrical storage device according to claim 1, wherein a thickness of the adhesive layer is 20 μm or less.

7. The exterior material for an electrical storage device according to claim 1, wherein a thickness of the adhesive layer is more than 20 μm and 60 μm or less.

8. The exterior material for an electrical storage device according to claim 1, wherein a thickness of the base material layer is 35 μm or less.

9. The exterior material for an electrical storage device according to claim 1, wherein a thickness of the base material layer is more than 35 μm and 50 μm or less.

10. An exterior material for an electrical storage device, the exterior material including a laminate provided with at least a base material layer, a barrier layer, an adhesive layer, and a heat-sealable resin layer in this order, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

11. A method of manufacturing an exterior material for an electrical storage device, the method comprising a step of laminating at least a base material layer, a barrier layer, an adhesive layer, and a heat-sealable resin layer in this order to obtain a laminate, wherein the heat-sealable resin layer has a melting peak temperature observed at 130° C. or lower, the adhesive layer has a melting peak temperature observed at 135° C. or higher, a resin constituting the heat-sealable resin layer has a polyolefin backbone, a resin constituting the adhesive layer has a polyolefin backbone, and a Martens hardness is 25.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

12. A method of manufacturing an exterior material for an electrical storage device, the method comprising a step of laminating at least a base material layer, a barrier layer, an adhesive layer, and a heat-sealable resin layer in this order to obtain a laminate, wherein a Martens hardness is 30.0 MPa or more, the Martens hardness being measured by pressing a Vickers indenter to a depth of 1 μm from a surface on a side of the heat-sealable resin layer of the exterior material for an electrical storage device in a thickness direction at a measurement temperature of 25° C. based on an indentation method.

13. An electrical storage device in which an electrical storage device element including at least a positive electrode, a negative electrode and an electrolyte is housed in a packaging formed of an exterior material for an electrical storage device according to claim 1.

* * * * *